(12) United States Patent
Javadov

(10) Patent No.: US 12,394,331 B1
(45) Date of Patent: Aug. 19, 2025

(54) STRINGED INSTRUMENT BOW GRIP TRAINER, ERGONOMIC GRIP FOR STRINGED INSTRUMENT BOW, AND/OR RETROFIT ACCESSORY FOR A MUSICAL INSTRUMENT

(71) Applicant: Rafael Javadov, Falls Church, VA (US)

(72) Inventor: Rafael Javadov, Falls Church, VA (US)

( * ) Notice: Subject to any disclaimer, the term of this patent is extended or adjusted under 35 U.S.C. 154(b) by 0 days.

(21) Appl. No.: 19/169,250

(22) Filed: Apr. 3, 2025

Related U.S. Application Data

(60) Provisional application No. 63/652,228, filed on Oct. 1, 2024.

(51) Int. Cl.
G09B 15/06 (2006.01)
G10D 3/16 (2020.01)

(52) U.S. Cl.
CPC ............... *G09B 15/06* (2013.01); *G10D 3/16* (2013.01)

(58) Field of Classification Search
CPC .................................. G09B 15/06; G10D 3/16
See application file for complete search history.

(56) References Cited

U.S. PATENT DOCUMENTS

| | | | | |
|---|---|---|---|---|
| 1,000,611 A | * | 8/1911 | Kurth | G10D 3/16 84/282 |
| 1,435,926 A | * | 11/1922 | Johnson | G10D 3/16 984/122 |
| 1,763,660 A | * | 6/1930 | Knopp | G10D 3/16 984/122 |
| 1,897,225 A | * | 2/1933 | Archer | G10D 3/16 984/122 |
| 2,820,388 A | * | 1/1958 | Rolland | G10D 3/16 984/122 |
| D257,152 S | * | 9/1980 | Alshin | 84/282 |
| 5,783,762 A | * | 7/1998 | Lindauer | G10D 3/16 84/453 |
| D577,058 S | * | 9/2008 | Krovoza | D17/20 |
| 7,595,441 B1 | * | 9/2009 | Dubell-Shockley | G09B 15/06 84/282 |
| 11,756,514 B2 | * | 9/2023 | Furlow | G10D 3/16 84/282 |
| 2015/0339945 A1 | * | 11/2015 | Dubell-Shockley | G10D 3/16 84/470 R |
| 2024/0274029 A1 | | 8/2024 | Weston | |

FOREIGN PATENT DOCUMENTS

| | | | | |
|---|---|---|---|---|
| ES | 1069135 U | * | 2/2019 | |
| FR | 3100078 A1 | * | 2/2021 | ............ G09B 15/06 |
| WO | WO-2018091399 A1 | * | 5/2018 | |

* cited by examiner

*Primary Examiner* — Robert W Horn
(74) *Attorney, Agent, or Firm* — GARCIA-ZAMOR INTELLECTUAL PROPERTY LAW, LLC; Ruy Garcia-Zamor

(57) ABSTRACT

An ergonomic grip for violin bows and/or other string instruments configured to teach proper grip techniques. A detachably affixable accessory for musical instruments designed to enhance playing abilities and reinforce correct posture and playing habits. A retrofit grip for a violin bow that encourages users—new and experienced alike—to properly grip the violin bow when playing the violin.

16 Claims, 15 Drawing Sheets

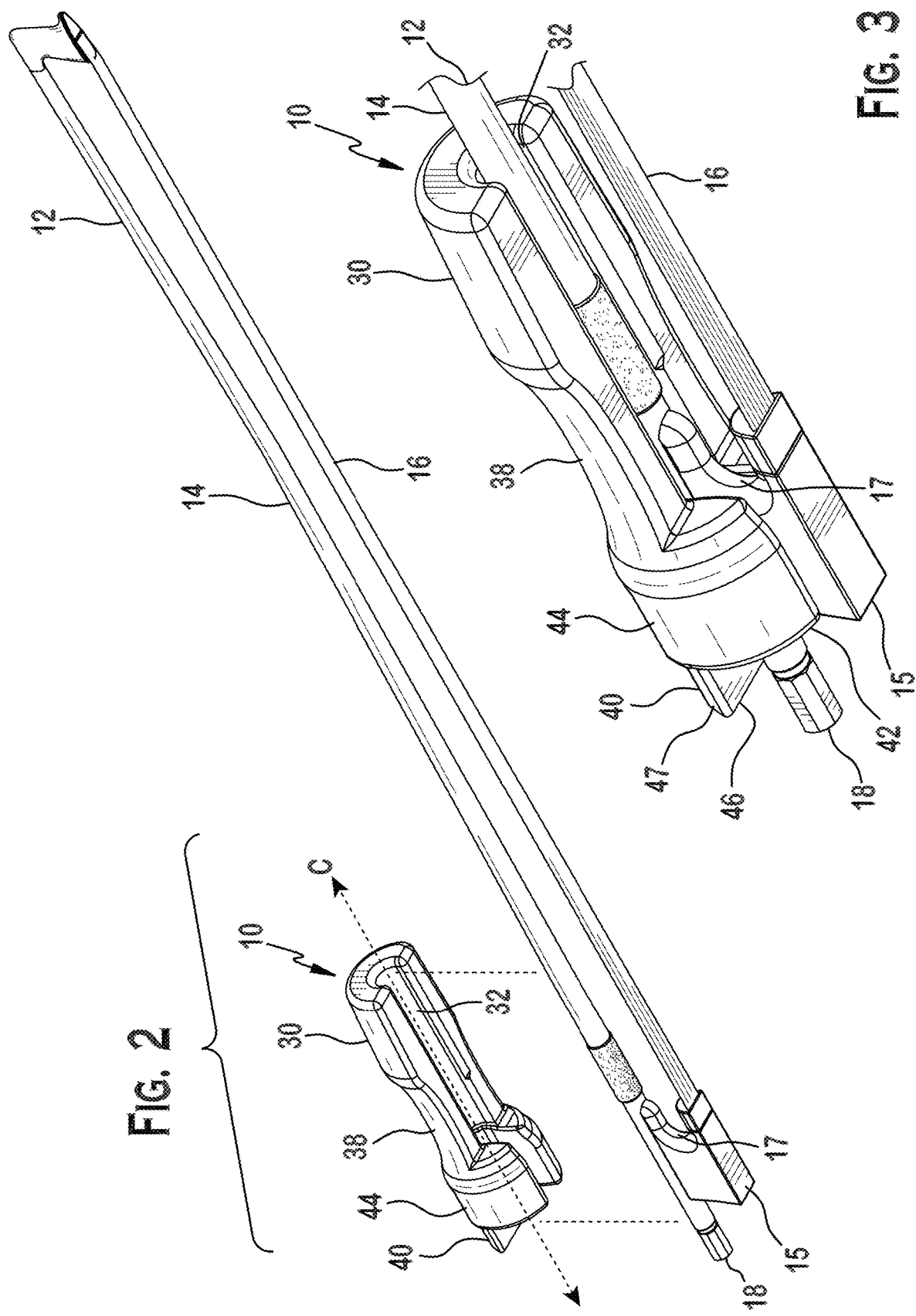

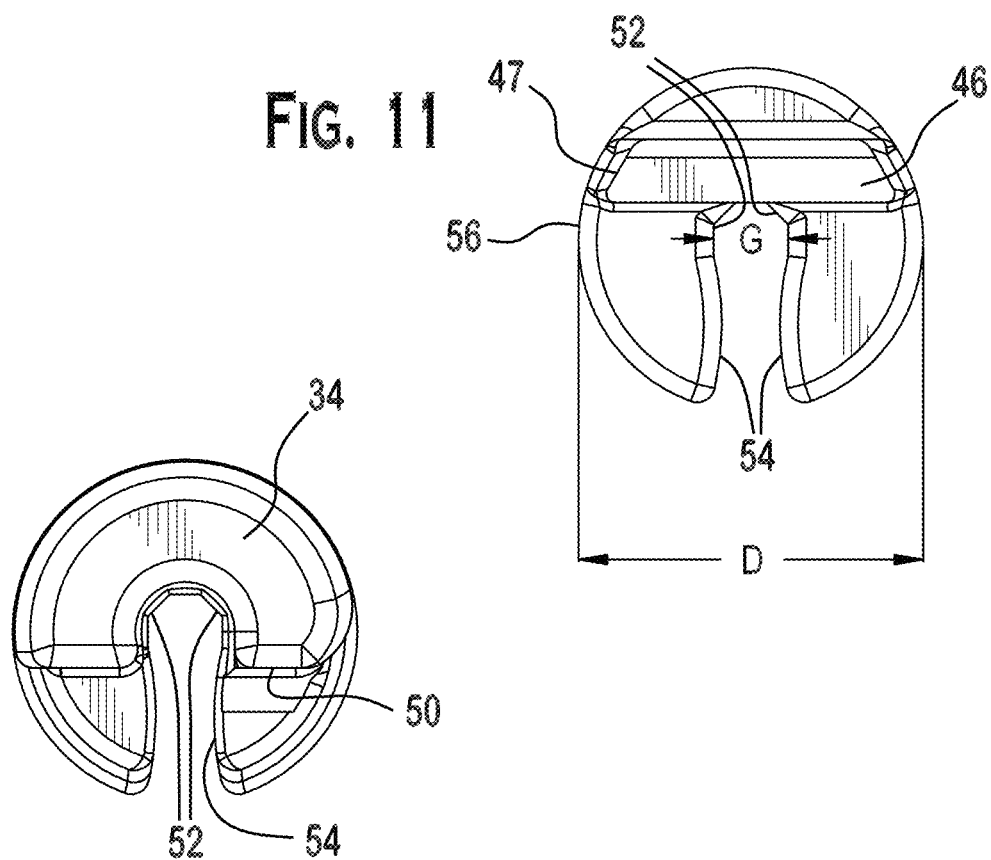
FIG. 11
FIG. 12
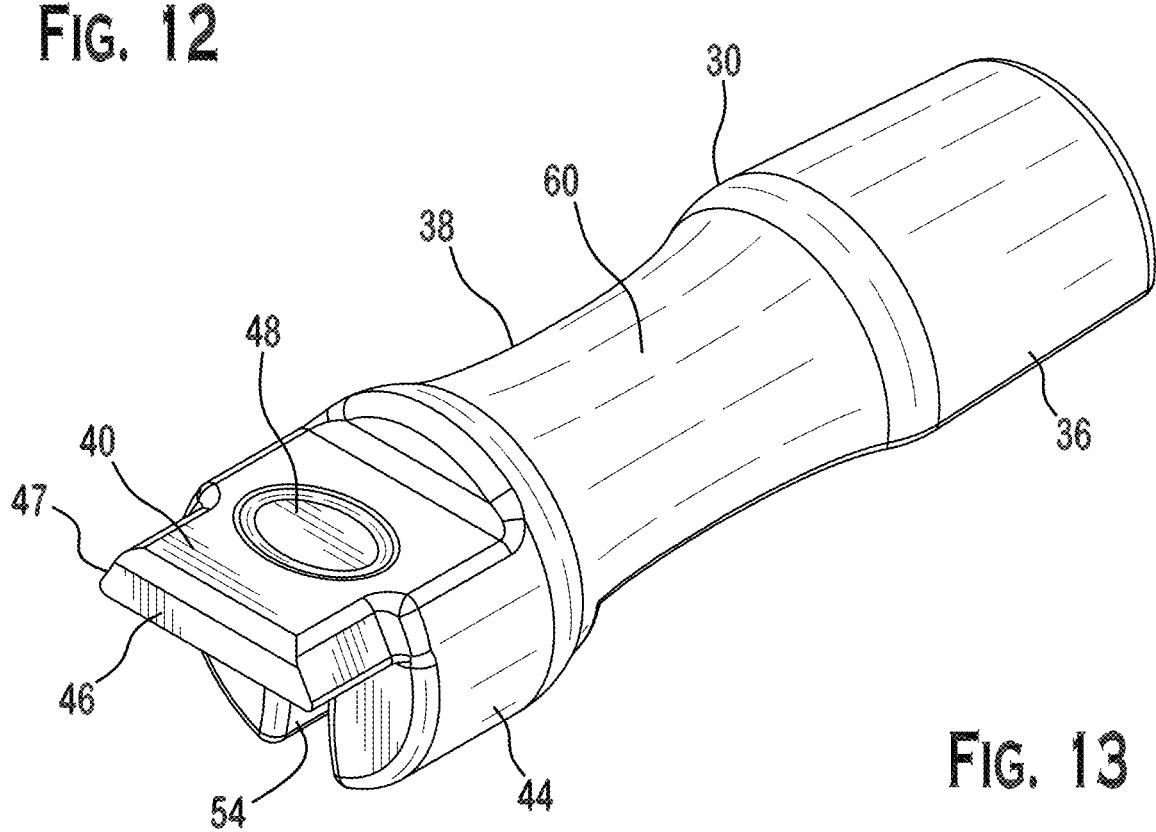
FIG. 13

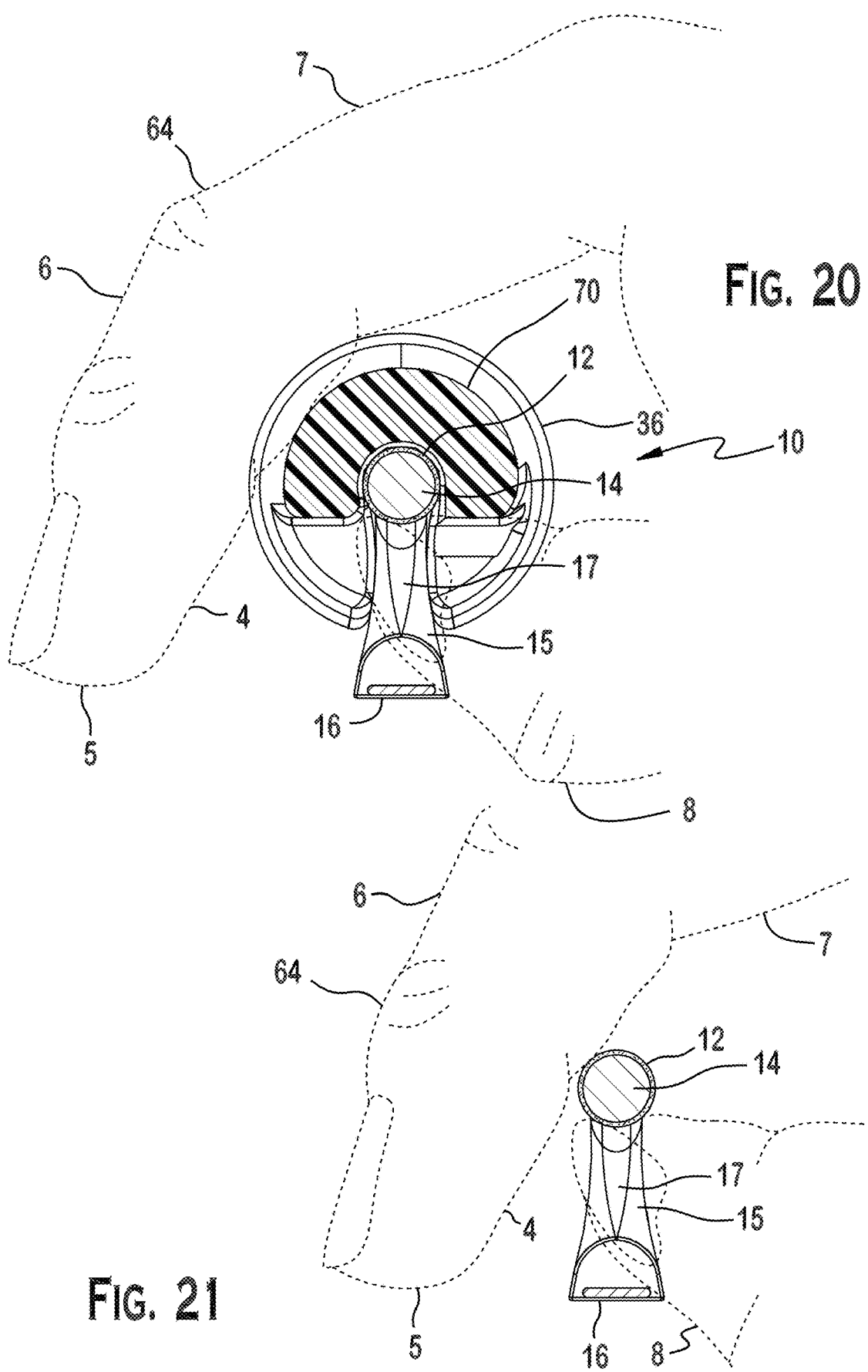

STRINGED INSTRUMENT BOW GRIP TRAINER, ERGONOMIC GRIP FOR STRINGED INSTRUMENT BOW, AND/OR RETROFIT ACCESSORY FOR A MUSICAL INSTRUMENT

CROSS REFERENCE TO RELATED APPLICATIONS

This application claims priority to and benefit of U.S. Provisional Patent No. 63/652,228, filed Oct. 1, 2024, which is hereby incorporated by reference in its entirety as if fully set forth herein.

BACKGROUND

The preferred embodiments of the present invention relate generally to musical instrument accessories. More specifically, the preferred embodiment of the present invention relates to a grip trainer for musical instruments. More specifically still, one preferred embodiment of the present invention relates to an ergonomic grip trainer for a stinged instrument bow, such as a violin, cello, bass bow or the like, which encourages proper playing habits and techniques.

Typically, beginner and experienced violin players alike tend to hold violin or other stringed instrument bows incorrectly. The tendency for these musicians is to grip the bow tightly or in a way that inhibits the free use and quick playing required of difficult music. It is imperative that the violin bow be gripped in such a way to allow the weight of the bow to be supported by the instrument itself and not the musician holding the bow. Therefore, it is an object of the present invention to train and encourage such advantageous grip practices when using a violin bow.

It may be advantageous to provide an ergonomic grip and/or a grip trainer for violins which may preferably, but not necessarily, include at least one of: an aesthetically pleasing design; be detachably affixable to a violin bow or to the bow of another string instrument; be able to be used with other stringed instruments; be made of a single piece of material; be an accessory for instruments; be visually appealing; have a low profile; not inhibit a musicians ability to play their instrument; be suitable for use by musicians of all skill levels; be sturdy enough for prolonged use in rehearsals and/or performances; be efficient for manufacture; be manufacturable in various colors; be useful for use by people with limited strength or of advanced age; and/or be easy to use.

SUMMARY

Briefly speaking, one embodiment of the present invention is directed to an ergonomic grip for an instrumental bow. The instrumental bow may have a main shaft. The ergonomic grip may be configured to be used by a hand of a user. The user's hand may have at least one finger. Each of the at least one fingers may have a distal phalanx having a distal end. The ergonomic grip may comprise a grip body and a bow groove. The grip body may have a central longitudinal axis running therethrough. The grip body may also have an intermediary surface which defines a target area thereon. The target area may have a generally semicircular cross-section taken in a direction perpendicular to the longitudinal axis. The bow groove may extend into the grip body along the central longitudinal axis. The bow groove may be further configured to receive the main shaft of the instrumental bow and secure the ergonomic grip thereto. The target area may be configured for the at least one finger of the user to be placed thereover. The target area may be curved. The target area may be further configured such that when the distal phalanx of the at least one finger may be positioned over the target area, the distal phalanx may supported and oriented in a direction generally tangent to the target area with the distal end pointing generally away from the bow groove.

In a separate aspect, the present invention is related to an ergonomic grip for an instrumental bow. The ergonomic grip may comprise a grip body and a bow groove. The grip body may have a central longitudinal axis running therethrough. The grip body may also have an intermediary surface which defines a target area thereon. The target area may have a generally semicircular cross-section taken in a direction perpendicular to the longitudinal axis. The bow groove may extend into the grip body along the central longitudinal axis. The bow groove may be further configured to receive the main shaft of the instrumental bow and secure the ergonomic grip thereto. The grip body may have a body diameter and the bow groove may have a groove width. The body diameter may be at least three times greater than the groove width.

In a separate aspect, the present invention is related to an ergonomic grip for an instrumental bow. The ergonomic grip may comprise a grip body and a bow groove. The grip body may have a central longitudinal axis running therethrough. The grip body may also have an intermediary surface which defines a target area thereon. The target area may have a generally semicircular cross-section taken in a direction perpendicular to the longitudinal axis. The target area may be textured to improve grip.

In a separate aspect, the present invention is related to an ergonomic grip for an instrumental bow. The ergonomic grip may comprise a grip body and a bow groove. The grip body may have a central longitudinal axis running therethrough. The grip body may also have an intermediary surface which defines a target area thereon. The target area may have a generally semicircular cross-section taken in a direction perpendicular to the longitudinal axis. The target area may be contoured to improve comfortability of a user's grip.

In a separate aspect, the present invention is related to an ergonomic grip for an instrumental bow. The ergonomic grip may comprise a grip body and a bow groove. The grip body may have a central longitudinal axis running therethrough. The bow groove may extend into the grip body along the central longitudinal axis. The bow groove may be further configured to receive the main shaft of the instrumental bow and secure the ergonomic grip thereto. The main shaft of the instrumental bow may be secured into the bow groove of the ergonomic grip via a pressure fit.

In a separate aspect, the present invention is related to an ergonomic grip for an instrumental bow. The ergonomic grip may comprise a grip body and a bow groove. The grip body may have a central longitudinal axis running therethrough. The grip body may also have an intermediary surface which defines a target area thereon. The target area may have a generally semicircular cross-section taken in a direction perpendicular to the longitudinal axis. The grip body may have a semi-continuous, rounded outer face. The semi-continuous, rounded outer face may be interrupted by the bow groove.

In a separate aspect, the present invention is related to an ergonomic grip for an instrumental bow. The ergonomic grip may comprise a grip body and a bow groove. The grip body may have a central longitudinal axis running therethrough. The bow groove may extend into the grip body along the central longitudinal axis. The bow groove may be further configured to receive the main shaft of the instrumental bow and secure the ergonomic grip thereto. The grip body may further comprise a bow gripping portion. The bow gripping portion may have a pinching portion and may at least partially define the bow groove. The pinching portion may form the pressure fit around a frog of the instrumental bow.

In a separate aspect, the present invention is related to an ergonomic grip for an instrumental bow. The ergonomic grip may comprise a grip body and a bow groove. The grip body may have a central longitudinal axis running therethrough. The bow groove may extend into the grip body along the central longitudinal axis. The bow groove may be further configured to receive the main shaft of the instrumental bow and secure the ergonomic grip thereto. The bow groove may have a first section and a second section. The first and second sections may be in series. The second section may be wider than the first section such that the second section may not interfere with the contact of a bow string of the instrumental bow with an instrument.

In a separate aspect, the present invention is related to an ergonomic grip for an instrumental bow. The ergonomic grip may comprise a grip body and a bow groove. The grip body may have a central longitudinal axis running therethrough. The bow groove may extend into the grip body along the central longitudinal axis. The bow groove may be further configured to receive the main shaft of the instrumental bow and secure the ergonomic grip thereto. The bow groove may have a first section and a second section. The first and second sections may be in series. The second section may be wider than the first section such that the second section may allow the user to properly position a thumb in contact with the main shaft and in a throat of the instrumental bow.

In a separate aspect, the present invention is related to an ergonomic grip for an instrumental bow. The ergonomic grip may comprise a grip body and a bow groove. The ergonomic grip may be formed from a single piece and made of a lightweight, high-friction material.

Another alternative preferred embodiment of the present invention is directed to a retrofit grip for a violin bow. The violin bow may have a bow shaft and a bow string. The retrofit grip may be configured to be used by a hand of a user. The hand may have at least one finger. Each of the at least one fingers may have a distal phalanx having a distal end. The retrofit grip may comprise a grip body and a channel extending therethrough. The grip body may have a central longitudinal axis and an outer surface defining a target area. The target area may have a generally semicircular cross-section taken in a direction perpendicular to the longitudinal axis. The channel may extend along the longitudinal axis. The channel may have a central bow shaft receiving portion extending through a radial center of the grip body and a transverse portion extending between the outer surface of the grip body and the central bow shaft receiving portion. The transverse portion may be narrower than the central bow shaft receiving portion such that the bow shaft may not be able to slip out of the central bow shaft receiving portion via the transverse portion. The transverse portion may also allow the bow to extend axially therethrough. The target area may be configured for the at least one finger of the user to be placed thereover. The target area may be curved. The target area may also be configured such that when the distal phalanx of the at least one finger may be positioned over the target area, the distal phalanx may be supported and oriented in a direction generally tangent to the target area with the distal end pointing generally away from the channel.

In a separate aspect, the present invention is related to a retrofit grip for a violin bow. The violin bow may have a bow shaft and a bow string. The retrofit grip may be configured to be used a hand of a user. The hand may have at least one finger. Each of the at least one fingers may have a distal phalanx having a distal end. The retrofit grip may comprise a grip body and a channel extending therethrough. The retrofit body may have a body diameter and the channel may have a groove width. The body diameter may be at least three times greater than the groove width.

In a separate aspect, the present invention is related to a retrofit grip for a violin bow. The violin bow may have a bow shaft and a bow string. The retrofit grip may be configured to be used a hand of a user. The hand may have at least one finger. Each of the at least one fingers may have a distal phalanx having a distal end. The retrofit grip may comprise a grip body and a channel extending therethrough. The retrofit grip may comprise a grip body and a channel extending therethrough. The grip body may have a central longitudinal axis and an outer surface defining a target area. The outer surface may be textured to improve grip.

In a separate aspect, the present invention is related to a retrofit grip for a violin bow. The violin bow may have a bow shaft and a bow string. The retrofit grip may be configured to be used a hand of a user. The hand may have at least one finger. Each of the at least one fingers may have a distal phalanx having a distal end. The retrofit grip may comprise a grip body and a channel extending therethrough. The retrofit body may have a body diameter and the channel may have a groove width. The body diameter may be at least four times greater than the groove width.

In a separate aspect, the present invention is related to a retrofit grip for a violin bow. The violin bow may have a bow shaft and a bow string. The retrofit grip may be configured to be used a hand of a user. The hand may have at least one finger. Each of the at least one fingers may have a distal phalanx having a distal end. The retrofit grip may comprise a grip body and a channel extending therethrough. The channel may have a central bow shaft receiving portion extending through a radial center of the grip body and a transverse portion extending between the outer surface of the grip body and the central bow shaft receiving portion. The channel may have a first section and a second section. The first and second sections may be in series. The second section may be wider than the first section such that the second section may allow a user to properly position a thumb between the bow string and the bow shaft of the violin bow.

Another alternative preferred embodiment of the present invention is directed to an ergonomic grip for a stringed instrument bow. The ergonomic grip may comprise a gripping portion and a bow holding portion. The bow holding portion may be contained within the gripping portion. The ergonomic grip may be configured to be detachably affixed to the stringed instrument bow by inserting a main shaft of the stringed instrument bow into the bow holding portion of the ergonomic grip.

In a separate aspect, the present invention is related to a stringed instrument bow. The ergonomic grip may comprise a gripping portion and a bow holding portion. The bow holding portion may be contained within the gripping portion. The main shaft of the stringed instrument bow may be secured into the bow holding of the ergonomic grip via a pressure fit.

In a separate aspect, the present invention is related to a stringed instrument bow. The ergonomic grip may comprise a gripping portion and a bow holding portion. The gripping portion may have a semi-continuous, rounded outer face. The semi-continuous, rounded outer face may be interrupted by the bow holding portion.

In a separate aspect, the present invention is related to a stringed instrument bow. The ergonomic grip may comprise a gripping portion and a bow holding portion. The bow holding portion may be contained within the gripping portion. The bow holding portion may have a first section and a second section. The first and second sections may be in series. The second section may be wider than the first section such that the second section may not interfere with the contact of a bow string of the stringed instrument bow with a stringed instrument.

In a separate aspect, the present invention is related to a stringed instrument bow. The ergonomic grip may comprise a gripping portion and a bow holding portion. The ergonomic grip may be formed from a single piece and made of a lightweight, high-friction material.

BRIEF DESCRIPTION OF THE DRAWINGS

The foregoing summary, as well as the following detailed description of the preferred embodiments of the present invention will be better understood when read in conjunction with the appended drawings. For the purpose of illustrating the invention, there are shown in the drawings embodiments which are presently preferred. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. It is understood, however, that the invention is not limited to the precise arrangements and instrumentalities shown. In the drawings:

FIG. 2 is a lower perspective view of an ergonomic grip 10 for a violin bow 12 in the preferred embodiment. Here, the ergonomic grip 10 may be seen positioned over the violin bow 12 before being attached thereto. The ergonomic grip 10 may comprise a grip body 30 and bow groove 32 extending therethrough along a central longitudinal axis C.

Figure 1:
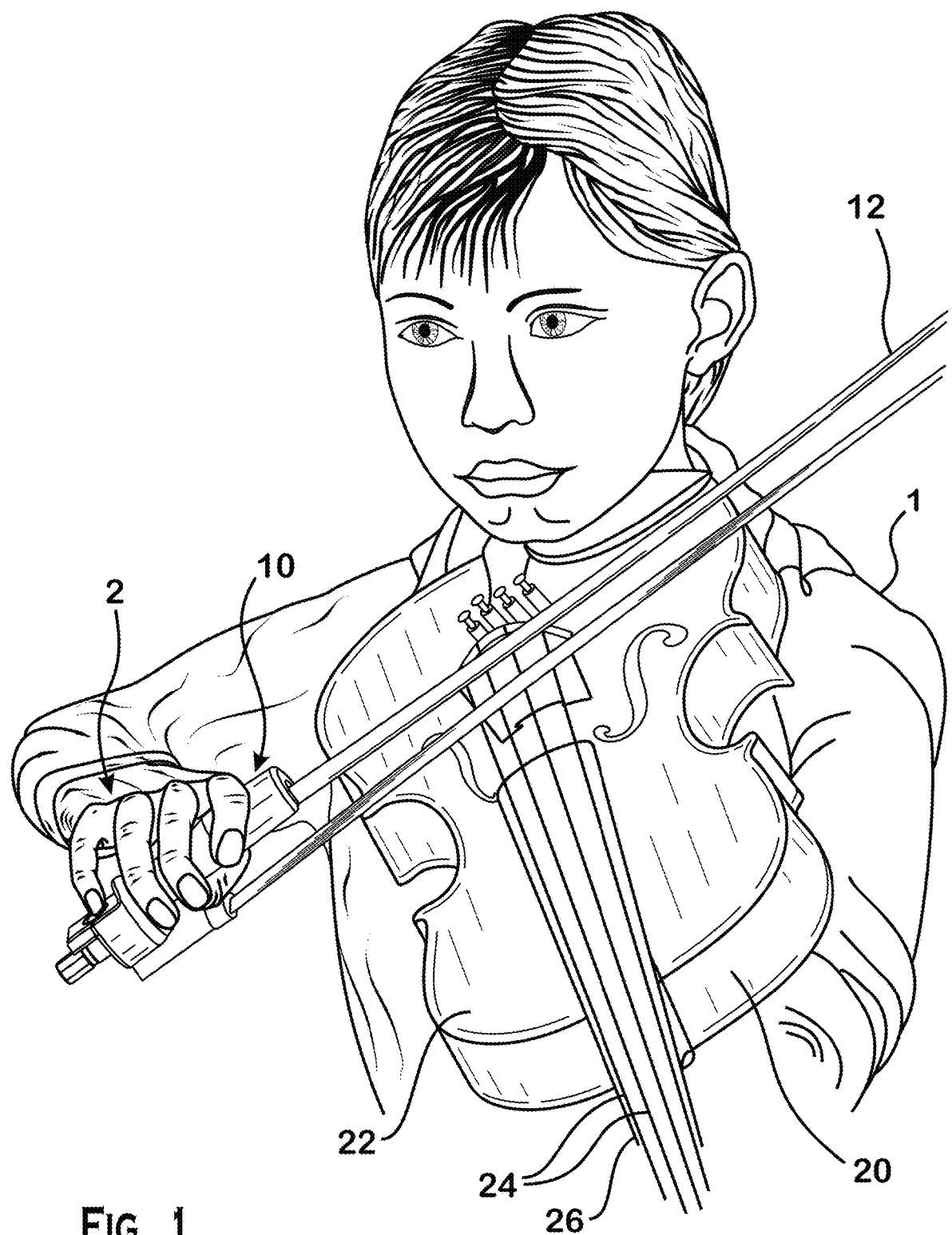
FIG. 1 is an upper perspective view of an ergonomic grip 10 for a violin bow 12 being used by a user 1 with a violin 20 in the preferred embodiment. Here, it may be seen that the ergonomic grip 10 may be connected to the violin bow 12. The user 1 may have a hand 2 holding the ergonomic grip 10. The user 1 may be engaging the violin bow 12 via the ergonomic grip 10 to play the violin 20. The violin 20 may comprise a violin body 22 connected to a neck 26 extending therefrom. A plurality of strings 24 may span a distance from one end of the violin body 22 to an opposite end of the neck 26. The violin bow 12 may be configured to contact the plurality of strings 24. While a violin bow is shown in FIG. 1 and the term "violin bow" is used throughout the specification, those of ordinary skill in the art will appreciate from this disclosure that the term "violin bow" is defined as meaning "any one of a violin bow, viola bow, cello bow, bass bow, stinged instrument bow, or the like" without departing from the scope of the present invention.

The violin bow 12 may have a main shaft 14 and a hair 16 extending therealong. The violin bow 12 may also have a frog 15 connecting the main shaft 14 to the hair 16. A screw 18 may be located on one distal end of the main shaft 14. A throat 17 may be defined in the gap formed between the main shaft 14, the frog 15, and the hair 16. The ergonomic grip 10 may configured to be attached to the violin bow 12 at the end including the frog 15.

FIG. 3 is a lower, partial perspective view of an ergonomic grip 10 for a violin bow 12 in the preferred embodiment. Here, the ergonomic grip 10 may be seen attached to the violin bow 12. This figure may show how the main shaft 14 of the violin bow 12 may extend axially through the bow groove 32 of the ergonomic grip 10. When the ergonomic grip 10 may be attached to the violin bow 12, the ergonomic grip 10 may partially cover the main shaft 14 and/or the frog 15 of the violin bow 12.

Figure 4:
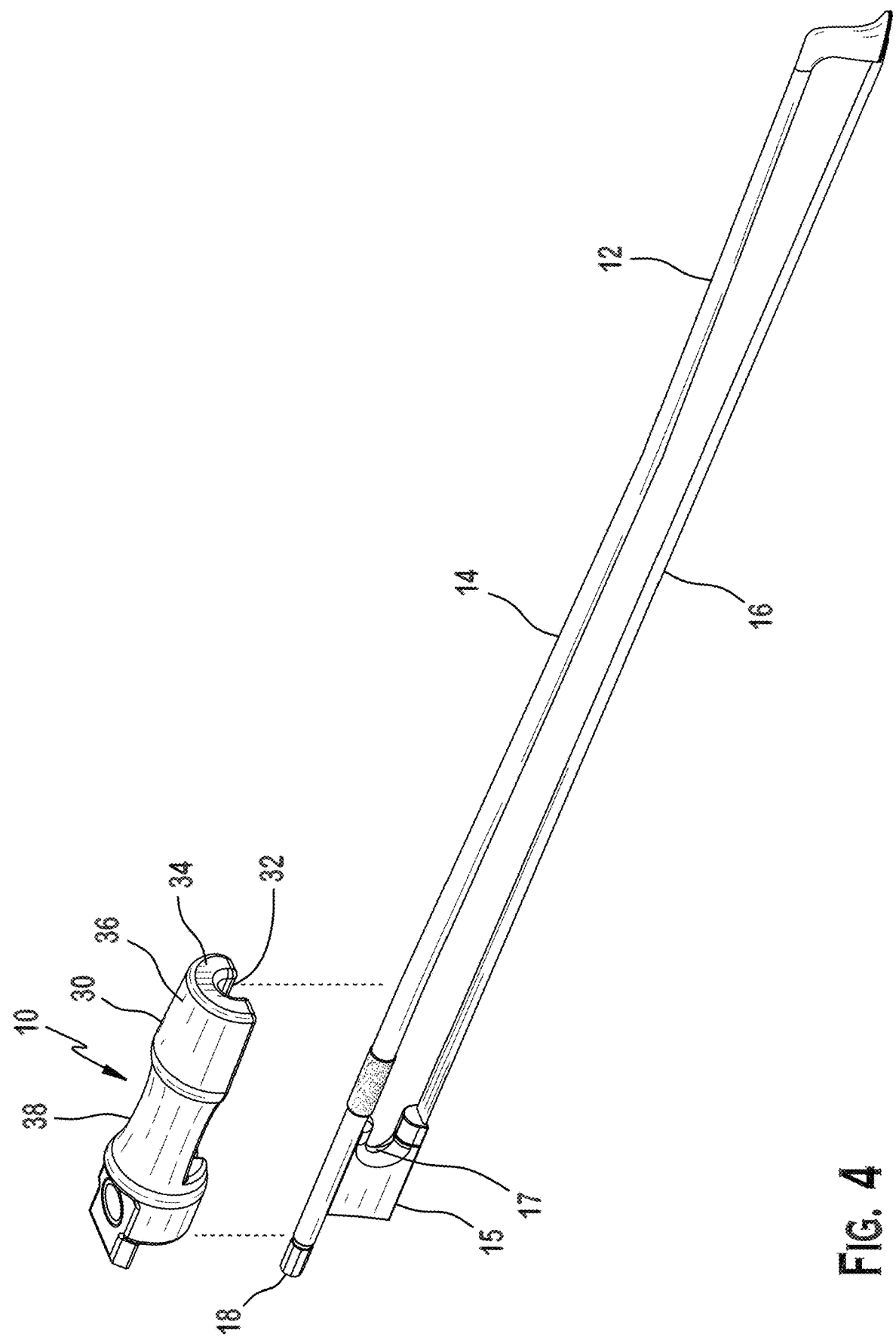

FIG. 4 is an upper perspective view of an ergonomic grip 10 for a violin bow 12 in the preferred embodiment. Here, the ergonomic grip 10 may be seen positioned over the violin bow 12 before being attached thereto. The grip body 30 of the ergonomic grip 10 may have a front surface 34 that may be positioned over the main shaft 14 of the violin bow 12. The front surface may be an axial surface. The grip body 30 may also comprise a forward surface 36 and an intermediary surface extending therealong. The forward and intermediary surfaces 36, 38 may be radial surfaces. The intermediary surface 38 may be at least partially positioned over the frog 15 of the violin bow 12.

Figure 5:
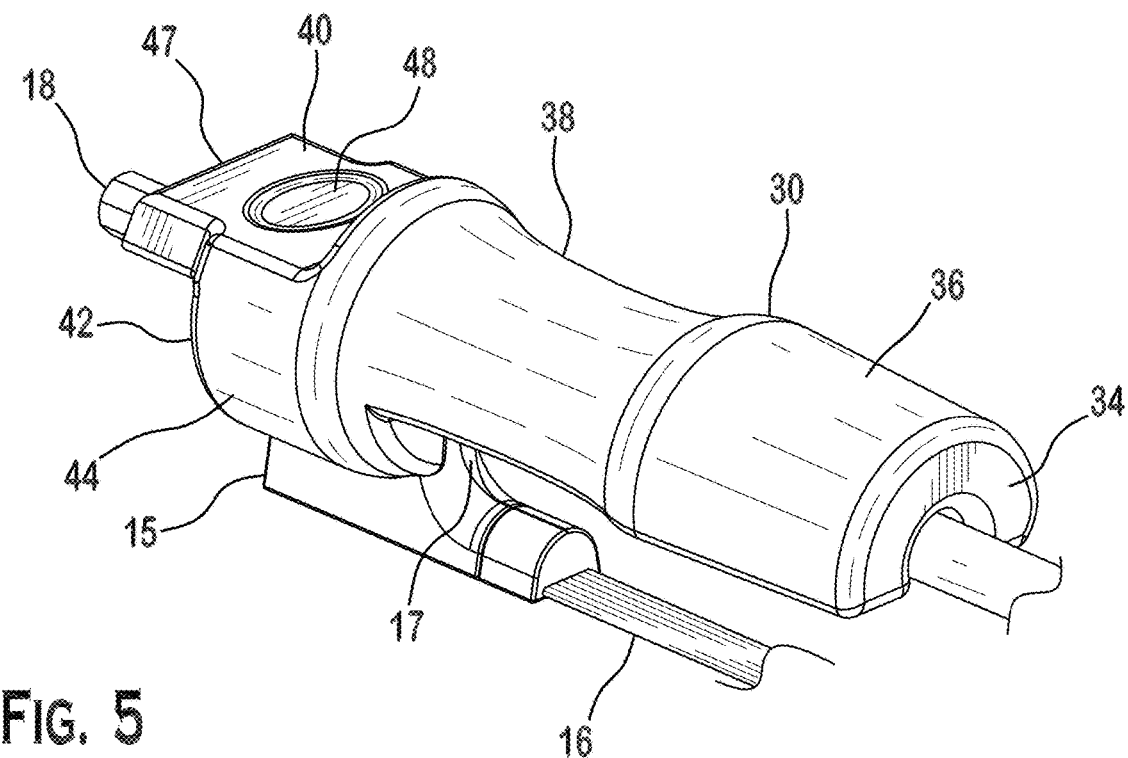

FIG. 5 is an upper, partial perspective view of an ergonomic grip 10 for a violin bow 12 in the preferred embodiment. Here, the ergonomic grip 10 may be seen attached to the violin bow 12. The ergonomic grip 10 may comprise an upper rear surface 40 connected to the intermediary surface 38 and opposite the forward surface 36. The ergonomic grip 10 may also comprise a bow gripping portion 42 configured to extend downwardly and around the frog 15 of the violin bow 12. The gripping portion 42 may have a bow gripping portion outer surface 44 extending circumferentially therearound.

Figure 6:
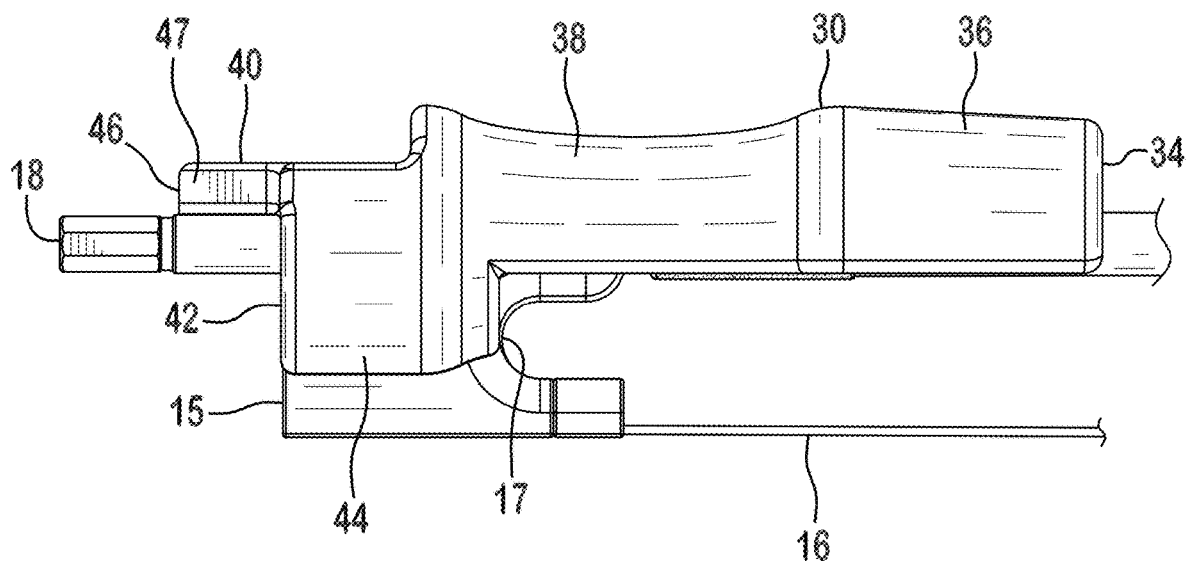

FIG. 6 is side view of an ergonomic grip 10 attached to a violin bow 12 in the preferred embodiment. Here, it may be seen how the various elements of the ergonomic grip 10 overlay corresponding elements of the violin bow 12 when attached. The bow gripping portion 42 may correspond to the frog 15 of the violin bow 12. The upper rear surface 40 may be positioned above the frog 15 and have a back surface 46 at an end opposite the front surface 34 of the grip body 32. The forward surface 36 may be positioned axially along a portion of the main shaft 14. The intermediary surface 38 may be positioned above the throat 17 of the violin bow 12. The upper rear surface 40 may extend along the main shaft 12 toward the screw 18.

Figure 7:
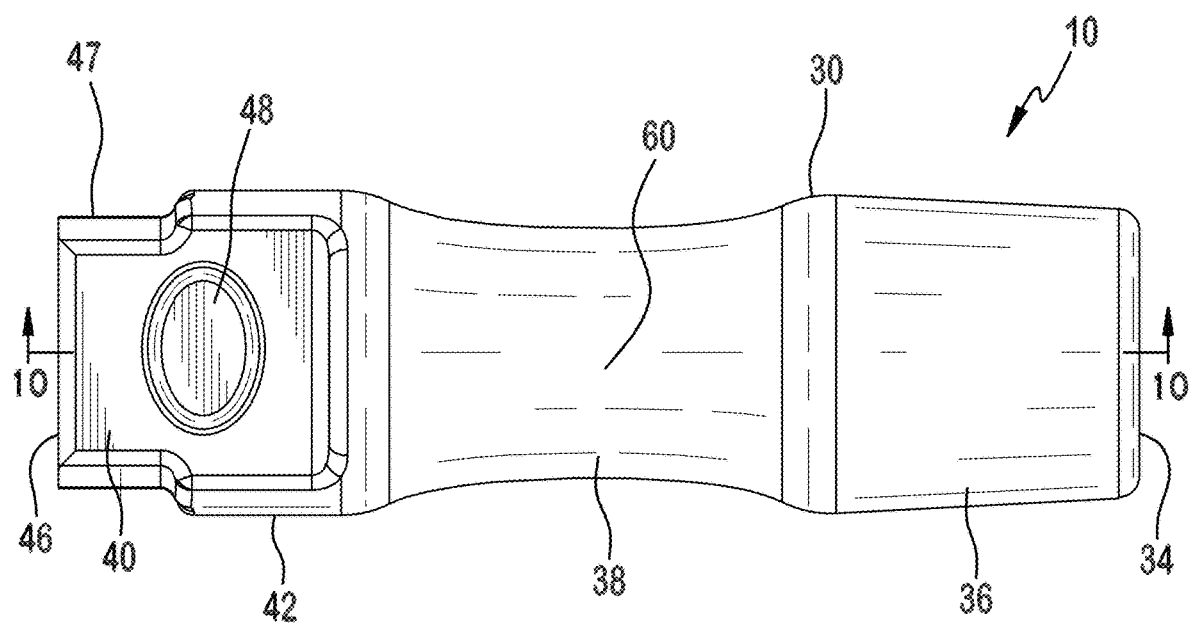

FIG. 7 is a top view of an ergonomic grip 10 for a violin bow 12 in the preferred embodiment. The upper rear surface 40 may comprise a pinky contacting portion 48 thereon. The pinky contacting portion 48 may be configured to contact a pinky 9 of a user 1 (see FIG. 22). The pinky contacting portion 48 may be recessed into the upper rear surface 40. One of ordinary skill in the art will appreciate from this disclosure that the pinky contacting portion may be an oval, a circle, a square, a trapezoid, a triangle, or the like, without departing from the scope of the present invention.

Figure 8:
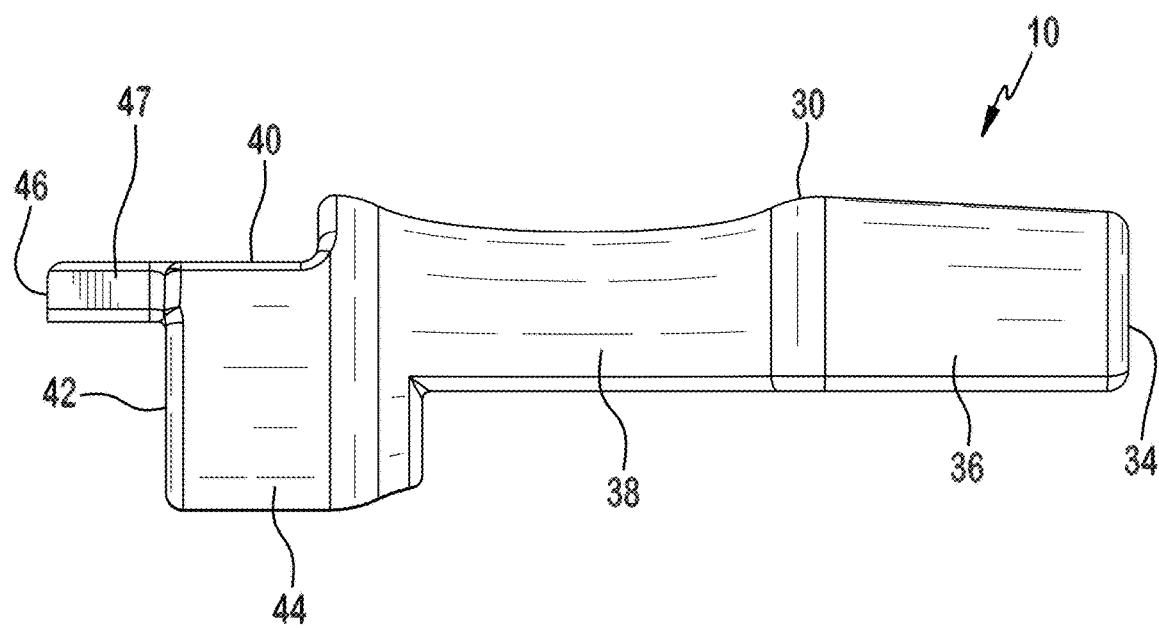

FIG. 8 is a side view of an ergonomic grip 10 in the preferred embodiment. This figure may highlight how the ergonomic grip 10 may be formed as a single piece via injection molding, 3D printing, compression molding, melt molding, or any other suitable manufacturing process as desired, without departing from the scope of the present invention.

Figure 9:
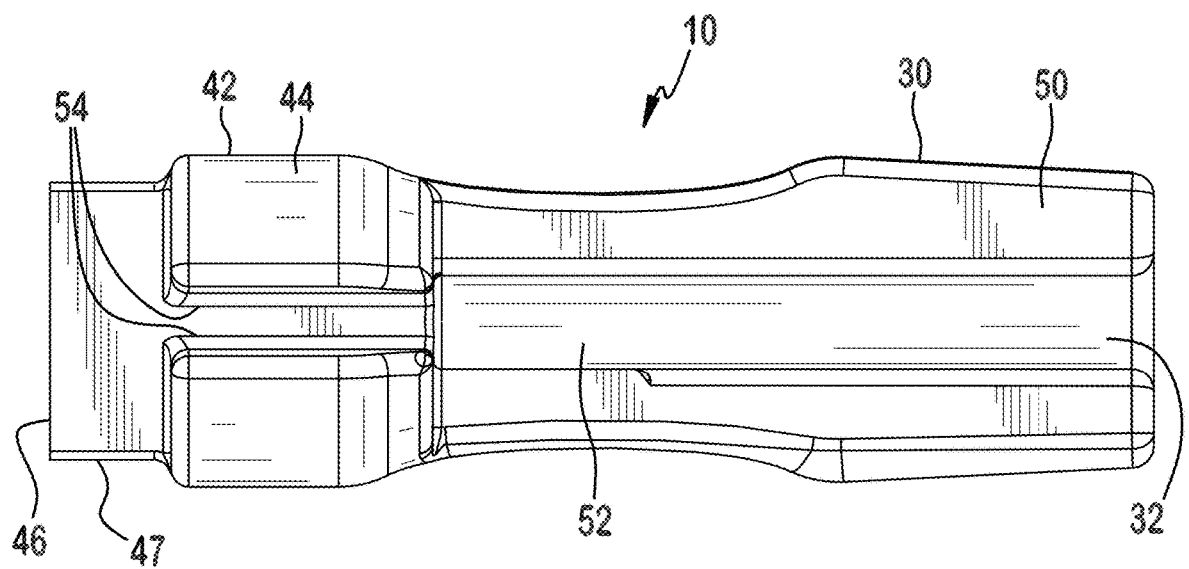

FIG. 9 is a bottom view of an ergonomic grip 10 in the preferred embodiment. Here, an underside 50 of the grip body 30 of the ergonomic device 10 may be seen in greater detail. The underside 50 may be flat, rounded, textured, pointed, or the like, without departing from the scope of the present invention. The underside 50 may define a bow contacting surface 52 therethrough. The bow contacting surface 52 may be arcuate and define the bow groove 32. The bow contacting surface 52 may be configured to contact the main shaft 14 of the violin bow 12 when the ergonomic grip 10 may be attached to a violin bow 12. This figure may also show the pinching portion 54 defined by the bow gripping portion 42 of the ergonomic grip 10. The pinching portion 54 may be configured to grip the frog 15 of a violin bow 12 via a pressure fit.

Figure 10:
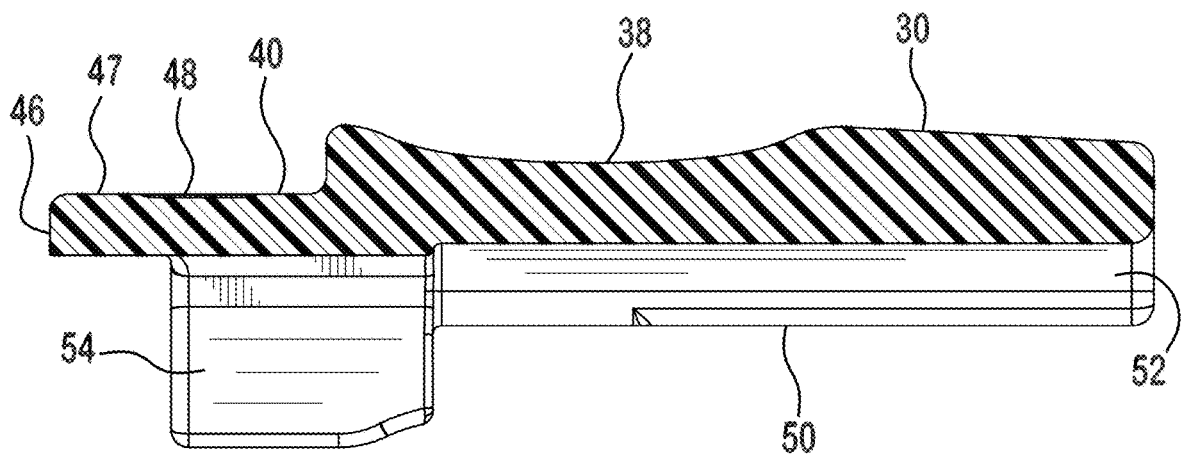

FIG. 10 is a side, cross-sectional view of an ergonomic grip 10 in the preferred embodiment as take along the lines 10-10 of FIG. 7. This figure may highlight how the bow contacting surface 52 may be semi-circular to accommodate the rounded shape of a main shaft 14 of a violin bow. It may also be seen that the bow contacting surface 52 may not extend past the underside 50. The pinching portion 54 may not be configured to contact the violin bow 12 when the violin bow 12 may be fully attached to ergonomic grip 10.

FIG. 11 is a rear view of the ergonomic grip 10 in the preferred embodiment. Here, it may be seen that the back surface 46 may form one axial end of the ergonomic grip 10. The grip body 30 may have a body diameter D. Similarly, the bow groove 32 may have a groove width G. The body diameter D may be greater than the groove width G. The pinching portion 54 may a separation which may be less than the groove width G. This may help to prevent the main shaft 14 of the violin bow 12 from slipping radially outward from the bow groove 32 when the ergonomic grip 10 may be attached to the violin bow 12. This figure may also highlight how the grip body 30 may have a semi-continuous rounded outer surface 56 only being interrupted by the separation of the pinching portion 54.

FIG. 12 is a front view of the ergonomic grip 10 in the preferred embodiment. Here, it may be seen that the front surface 34 may form one axial end of the ergonomic grip 10. This figure may also show more clearly how the bow contacting surface 52 clearly defines the bow groove 32 extending therethrough. The bow contacting surface 52 may be rounded or be made of a plurality of flat surfaces adjacent to one another without departing from the scope of the present invention.

FIG. 13 is an upper, perspective view of the ergonomic grip 10 in the preferred embodiment. Here, it may be seen how the forward and/or intermediary surface 36, 28 of the grip body may form a target area 60. The target area 60 may be configured to be contacted by at least one finger 3 of a user 1 (see FIG. 17). One of ordinary skill in the art would appreciate from this disclosure that the target area 60 may have a constant radial thickness, as depicted on the forward surface 36, or a variable radial thickness, as depicted on the intermediary surface 38, without departing from the scope of the present invention.

Figure 14:
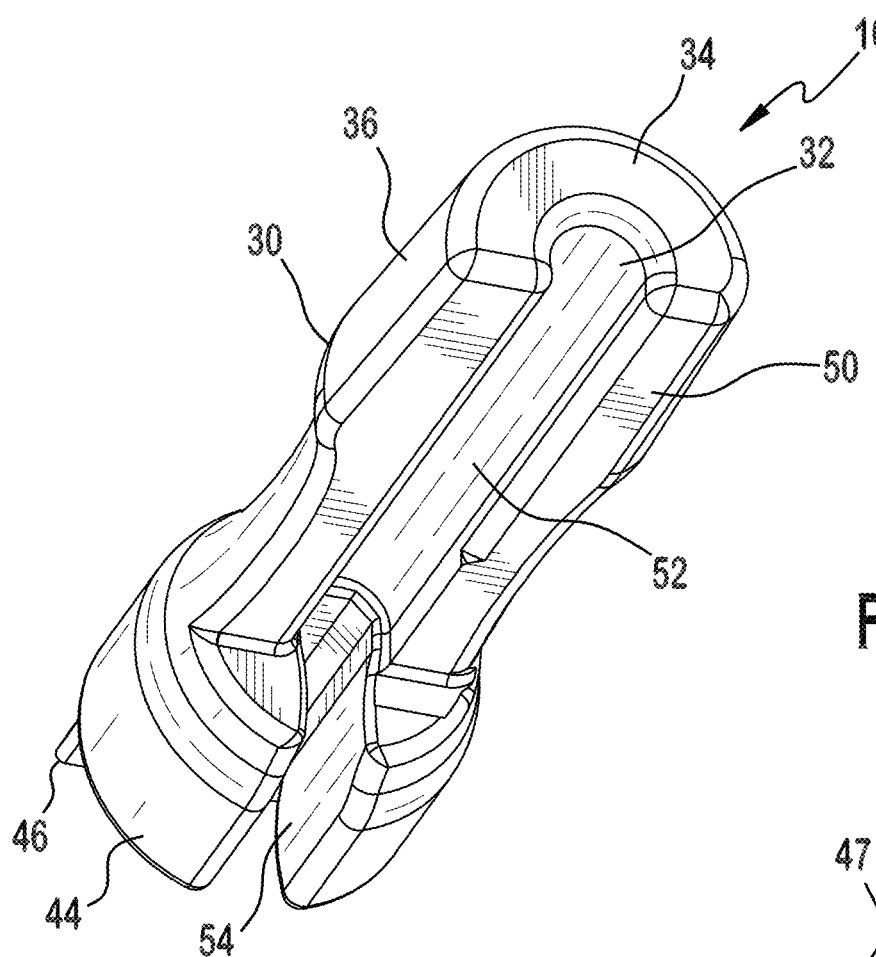

FIG. 14 is a lower, front perspective view of the ergonomic grip 10 in the preferred embodiment. Here, it may be seen in more detail how the bow groove 32 may extend along the entire axial length of the grip body 10.

Figure 15:
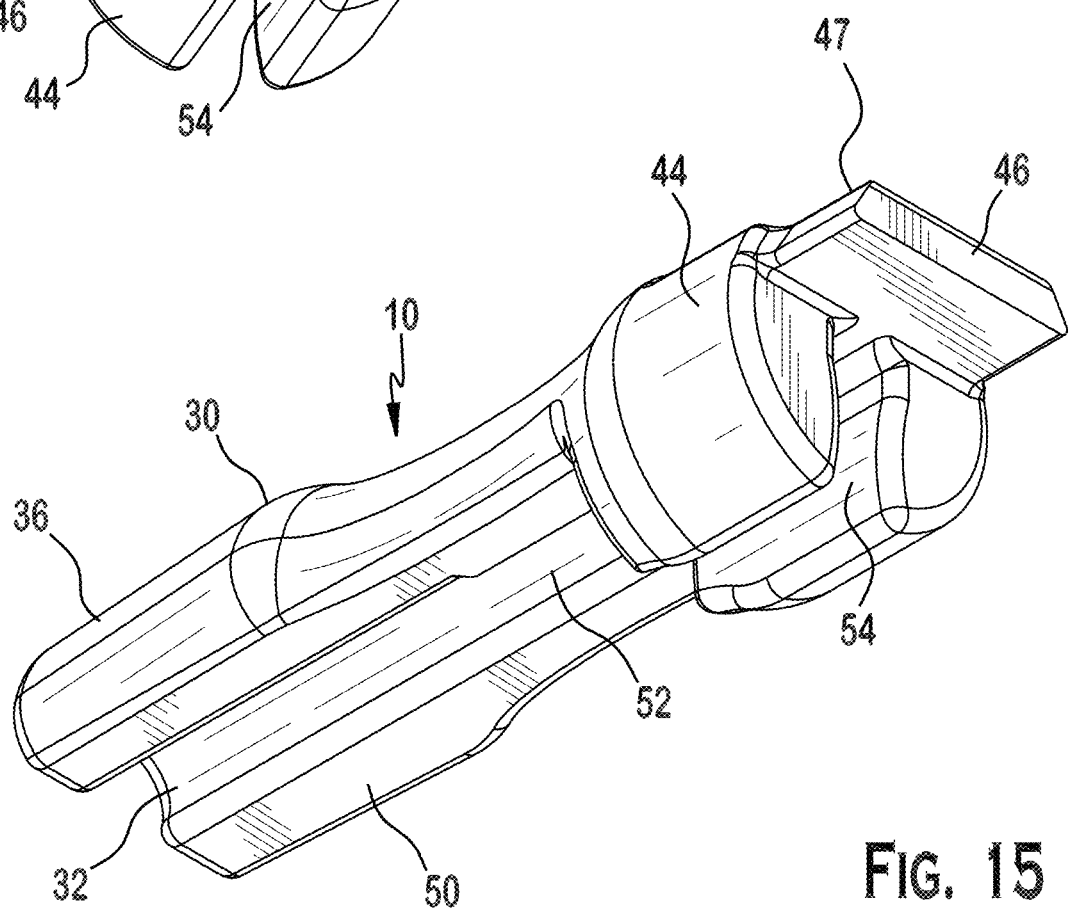

FIG. 15 is a lower, rear perspective view of the ergonomic grip 10 in the preferred embodiment. Here, it may be seen how the preferred embodiment of the present invention may include the back extending portion 47 which forms the back surface 46. One of ordinary skill in the art would appreciate from this disclosure that the back extending portion 47 may be omitted and the back surface 46 may be formed on the axial end of the bow gripping portion 42 without departing from the scope of the present invention.

Figure 16:
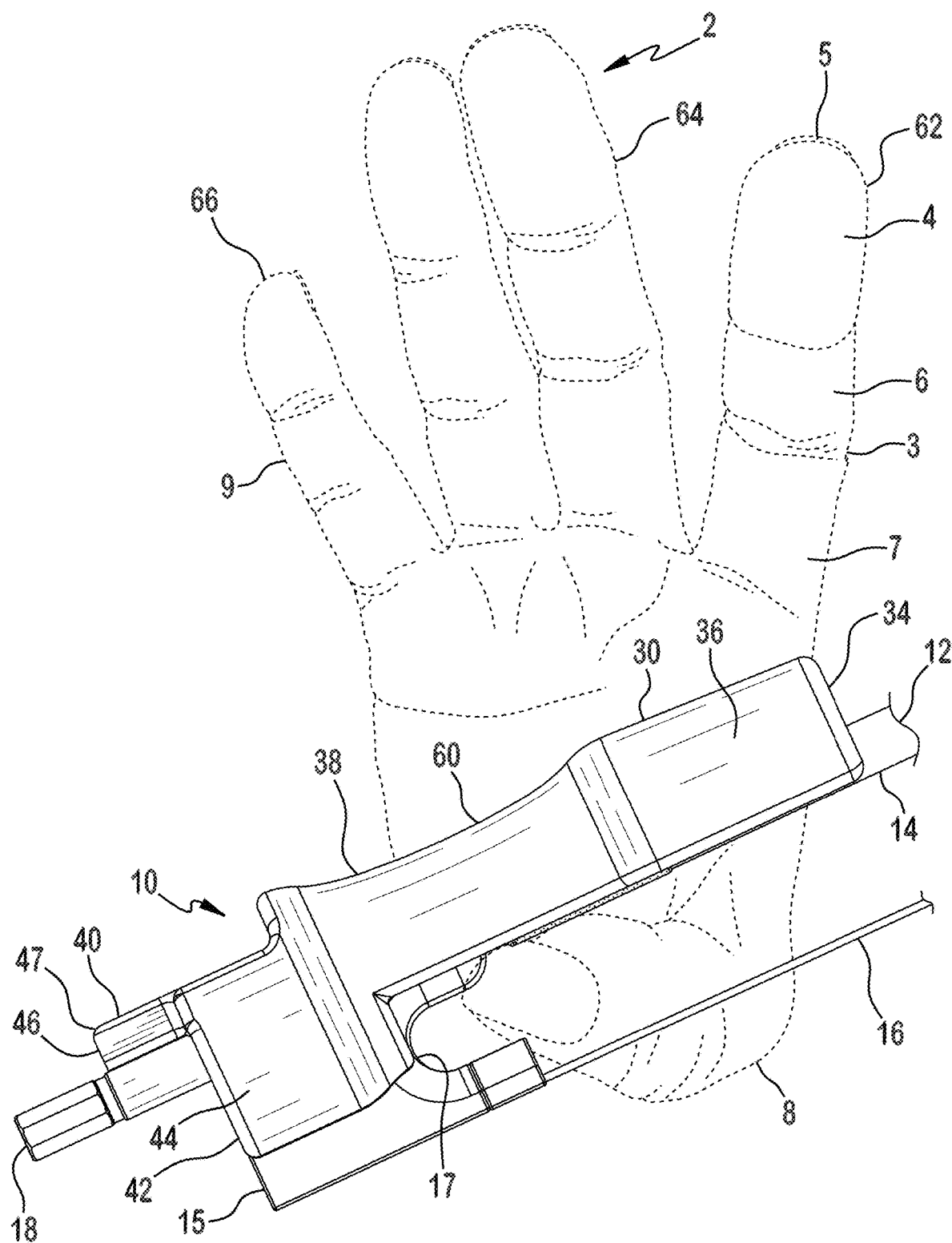

FIG. 16 is a side view of the ergonomic grip 10 attached to a violin bow 12 in the preferred embodiment. Here, the hand 2 of a user 1 may be seen preparing to properly grip the ergonomic grip 10. The hand 2 may include at least one finger 3. The at least one finger 3 may have a distal phalanx 4 having a distal end 5. The at least one finger 3 may also have a proximal phalanx 7 connecting the at least one finger 3 to the hand 2 and a middle phalanx 6 connecting the distal phalanx 4 to the proximal phalanx 7. Here, it may be seen how the thumb 8 may be partially inserted into the throat 17 of the violin bow 12.

Figure 17:
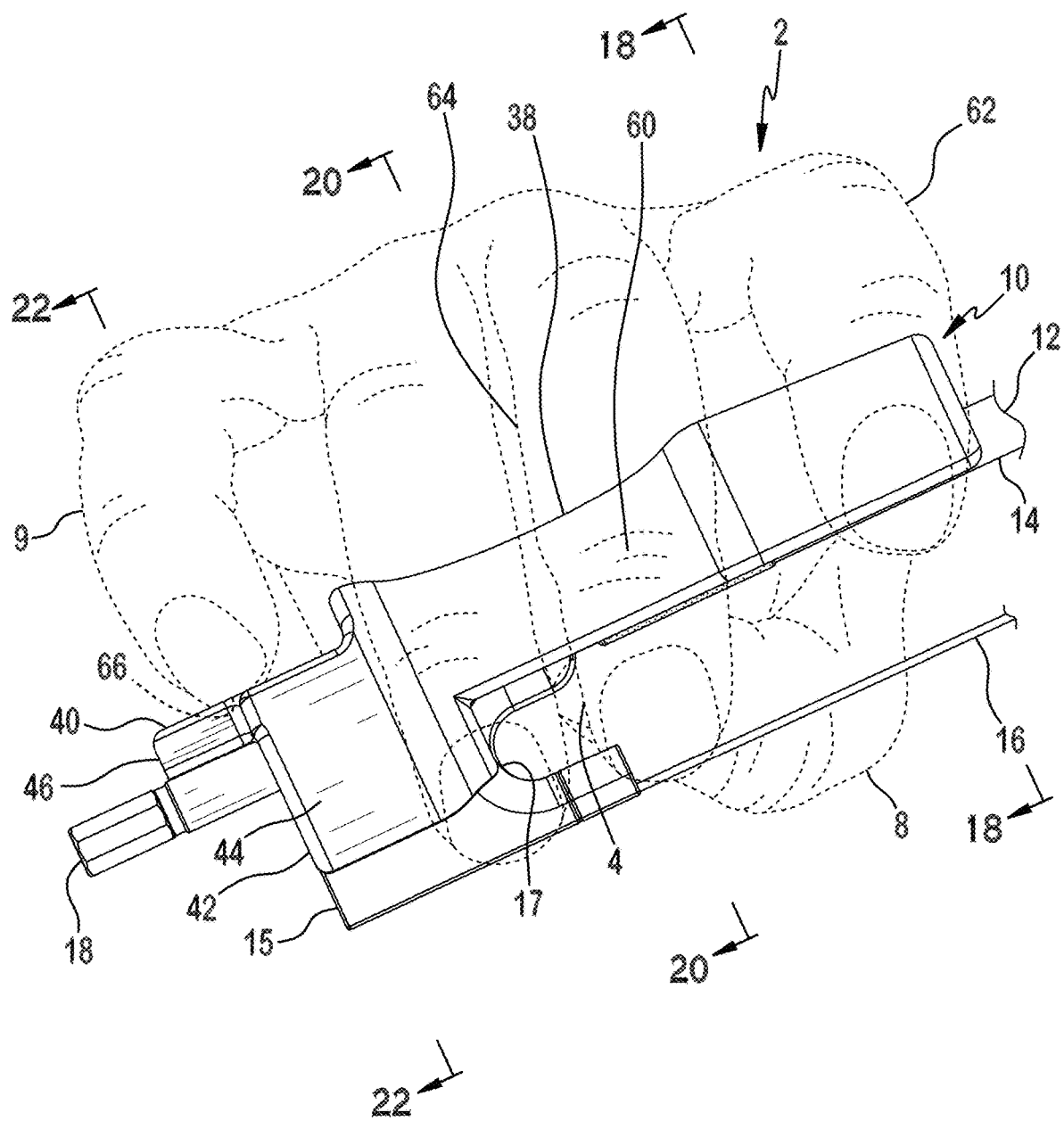

FIG. 17 is a side view of the ergonomic grip 10 attached to a violin bow 12 in the preferred embodiment. Here, the hand 2 of a user 1 may be seen properly gripping the ergonomic grip 10. The at least one finger 3—the index, middle, and/or ring finger—may be contacting the target area 60 of the ergonomic grip 10. The pinky 9 may be contacting the pinky contacting portion 48 on the upper rear surface 40. The shape of the intermediary portion 38 of the ergonomic grip 10 may allow the thumb 8 to still be inserted into the throat 17 of the violin bow 12 without interference or being physically blocked.

Figure 18:
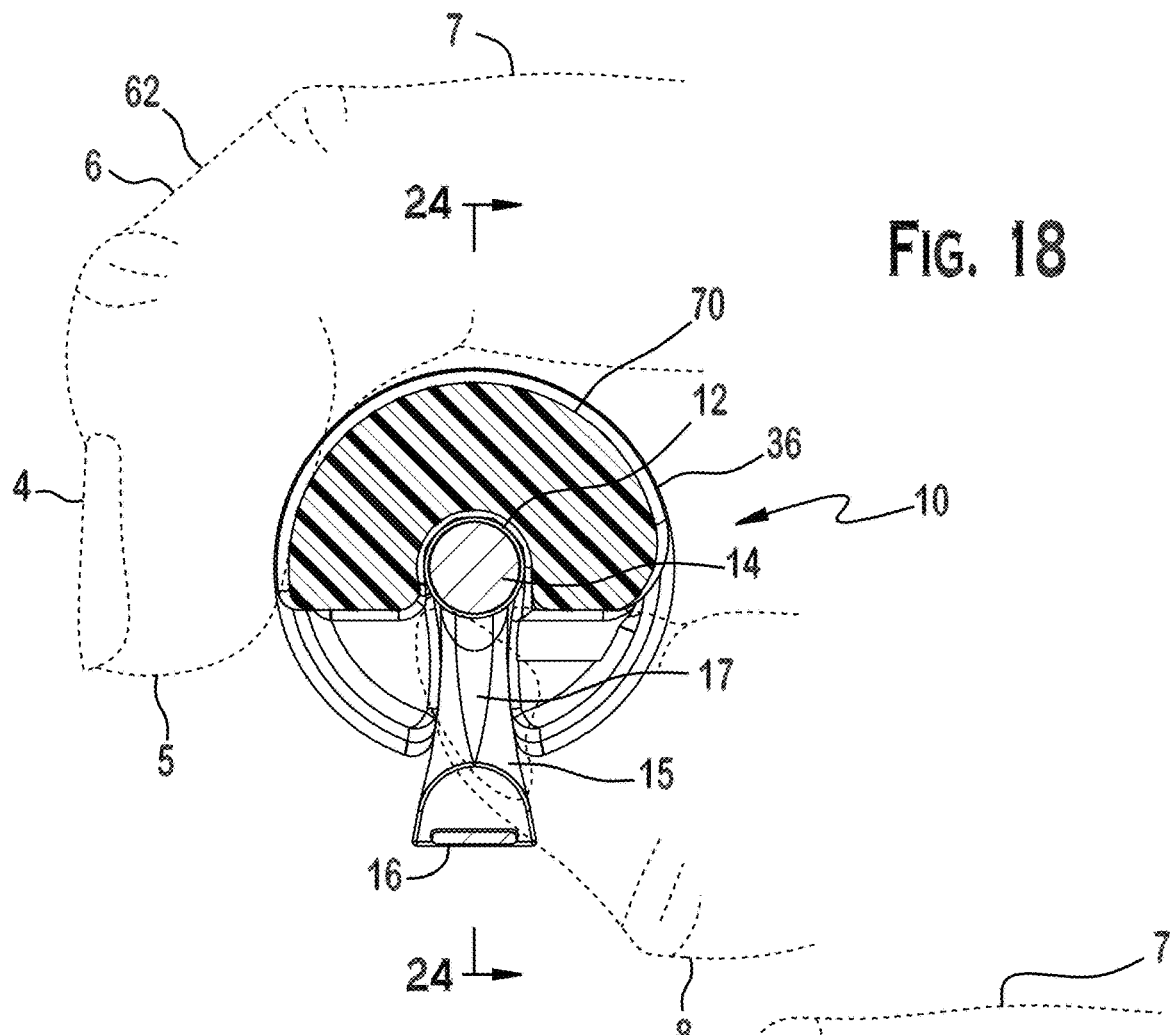

FIG. 18 is a front, cross-sectional view of the ergonomic grip 10 attached to a violin bow 12 in the preferred embodiment taken along the line 18-18 of FIG. 17. Here, it may be seen how an index finger 62 may be contacting the target surface 60 formed on the forward surface 36. The distal phalanx 4 may be the only portion of the index finger 62 that may contact the ergonomic grip 10. The distal end 5 of the index finger 62 may point generally away from the bow groove 32. This figure may also highlight how the target area 60 may have a generally semi-circular cross-section 70.

Figure 19:
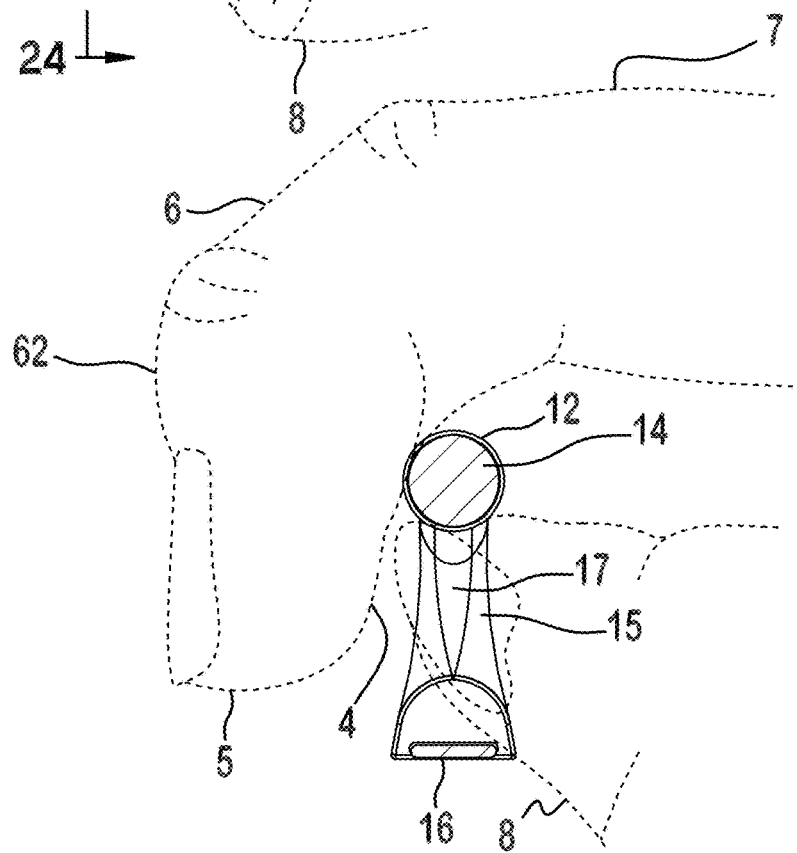

FIG. 19 is a front, cross-sectional view of a user 1 gripping a violin bow 12. This figure may show a similar perspective to that of FIG. 18. Once a user 1 may learn to properly grip the violin bow 12 using the ergonomic grip 10, the ergonomic grip 10 may be omitted, as shown here, and the user 1 may be able to properly grip the violin bow 12 with their index finger 62 directly as shown in this figure.

FIG. 20 is a front, cross-sectional view of the ergonomic grip 10 attached to a violin bow 12 in the preferred embodiment taken along the line 20-20 of FIG. 17. Here, it may be seen how a middle finger 64 may be contacting the target surface 60 formed on the intermediary surface 38. The distal phalanx 4 may be the only portion of the middle finger 64 that may contact the ergonomic grip 10. The distal end 5 of the middle finger 64 may point generally away from the bow groove 32. This figure may also highlight how the body diameter D of the grip body 30 may be variable at different axial points along the ergonomic grip 10 since the intermediary surface may be curved.

FIG. 21 is a front, cross-sectional view of a user 1 gripping a violin bow 12. This figure may show a similar perspective to that of FIG. 20. Once a user 1 may learn to properly grip the violin bow 12 using the ergonomic grip 10, the ergonomic grip 10 may be omitted, as shown here, and the user 1 may be able to properly grip the violin bow 12 with their middle finger 64 directly as shown in this figure.

Figure 22:
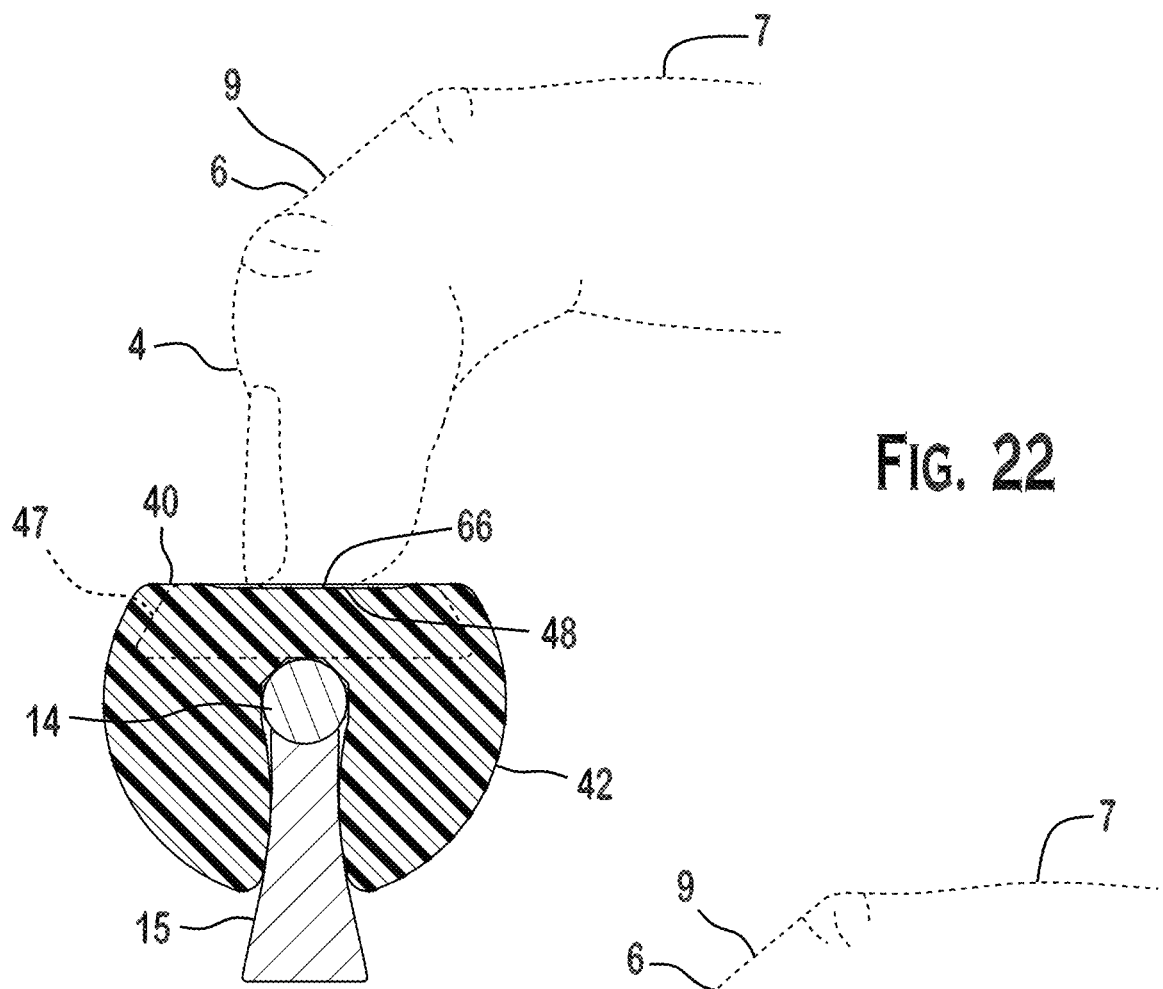

FIG. 22 is a front, cross-sectional view of the ergonomic grip 10 attached to a violin bow 12 in the preferred embodiment taken along the line 22-22 of FIG. 17. Here, it may be seen how a pinky 9 may contact the pinky contacting portion 48 of the upper rear surface 40. A pinky tip 66 of the pinky 9 may be encouraged to fall directly into the recessed pinky contacting portion 48. Unlike the aforementioned fingers, the distal end 66 of the pinky 9 may generally point toward the bow groove 32. This figure may also highlight exactly how the pinching portion 54 of the bow gripping portion 42 may grab onto the frog 15 of the violin bow 12.

Figure 23:
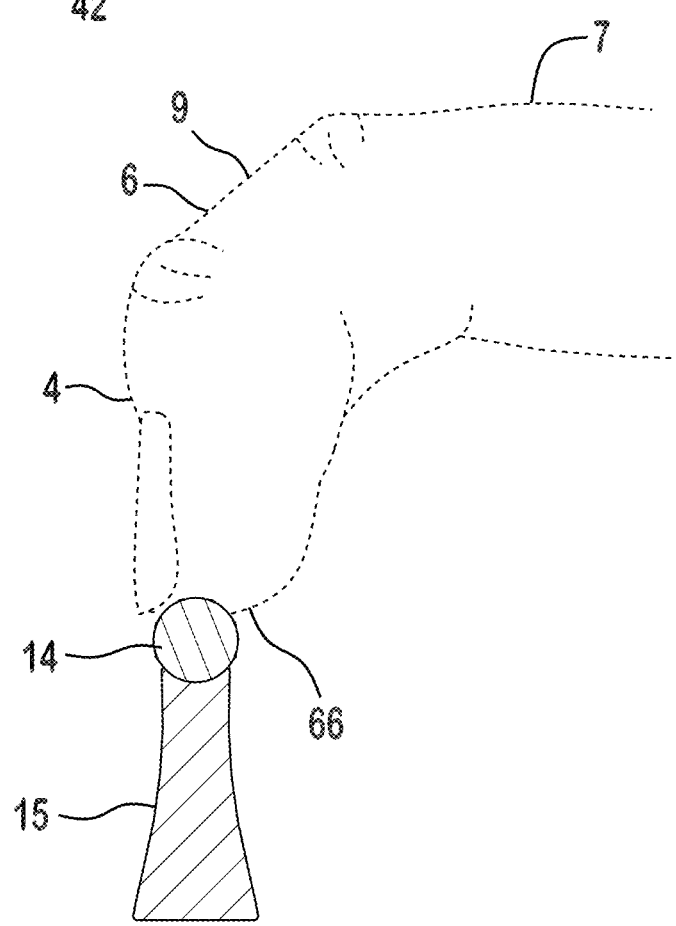

FIG. 23 is a front, cross-sectional view of a user 1 gripping a violin bow 12. This figure may show a similar perspective to that of FIG. 22. Once a user 1 may learn to properly grip the violin bow 12 using the ergonomic grip 10, the ergonomic grip 10 may be omitted, as shown here, and the user 1 may be able to properly rest their pinky 9 on the violin bow 12 as shown in this figure.

Figure 24:
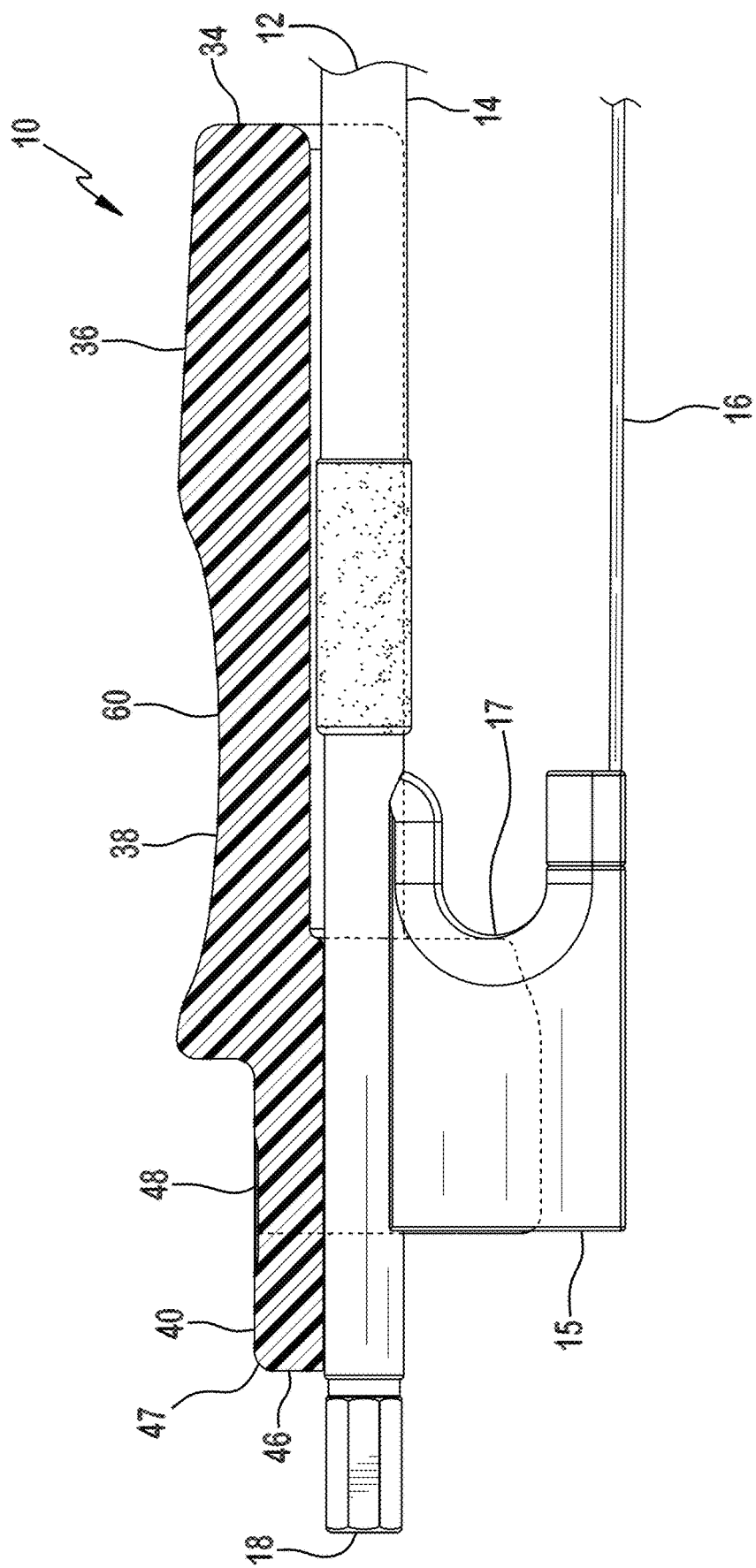

FIG. 24 is a side, cross-sectional view of the ergonomic grip 10 attached to a violin bow 12 in the preferred embodiment as taken along the line 24-24 of FIG. 18. Here, the inside of the bow groove 32 may be seen in greater detail when the main shaft 14 of the violin bow 12 may be inserted therein.

Figure 25:
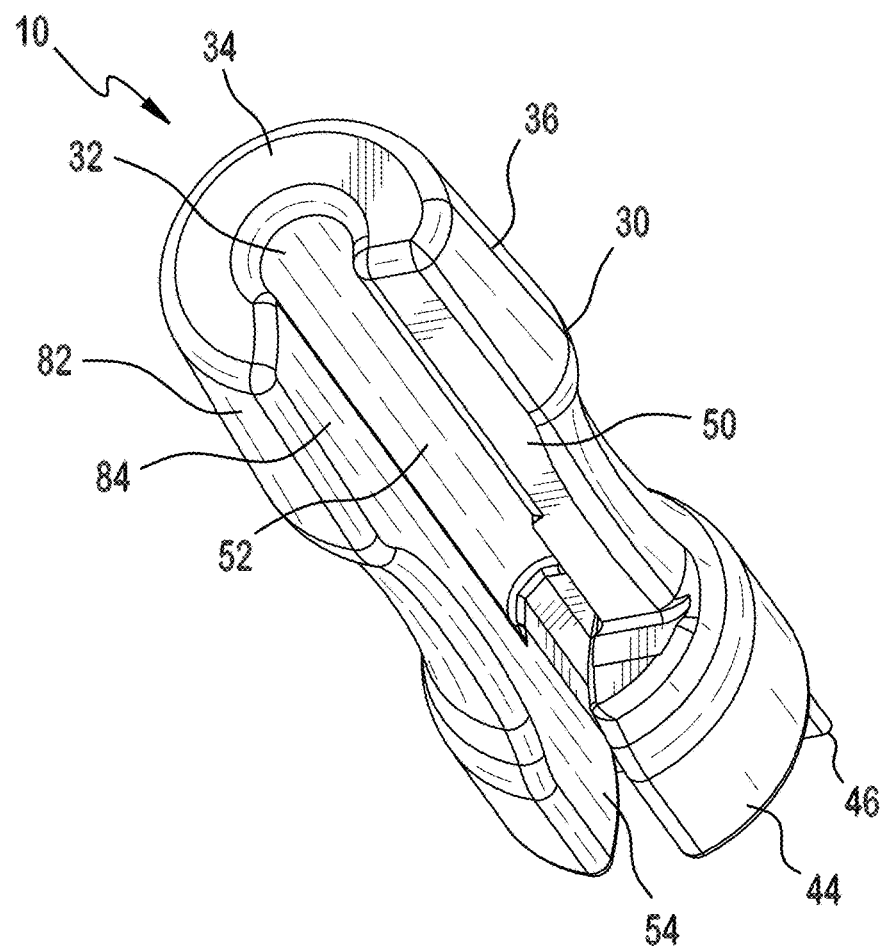

FIG. 25 is a bottom, perspective view of an alternative preferred embodiment of the ergonomic grip 10. In this embodiment, the forward and intermediary surfaces 36, 38 may extend approximately two hundred seventy degrees (270°) around the grip body 30 to form an extended section 82. This extended section 82 may be opposite a user 1 when the ergonomic grip 10 may be attached to a violin bow 12. In this way, the extended section 82 may partially conceal the throat 17 of the violin bow 12 from an outward observer's perspective while still allowing a user 1 to insert a thumb 8 into the throat 17.

Figure 26:
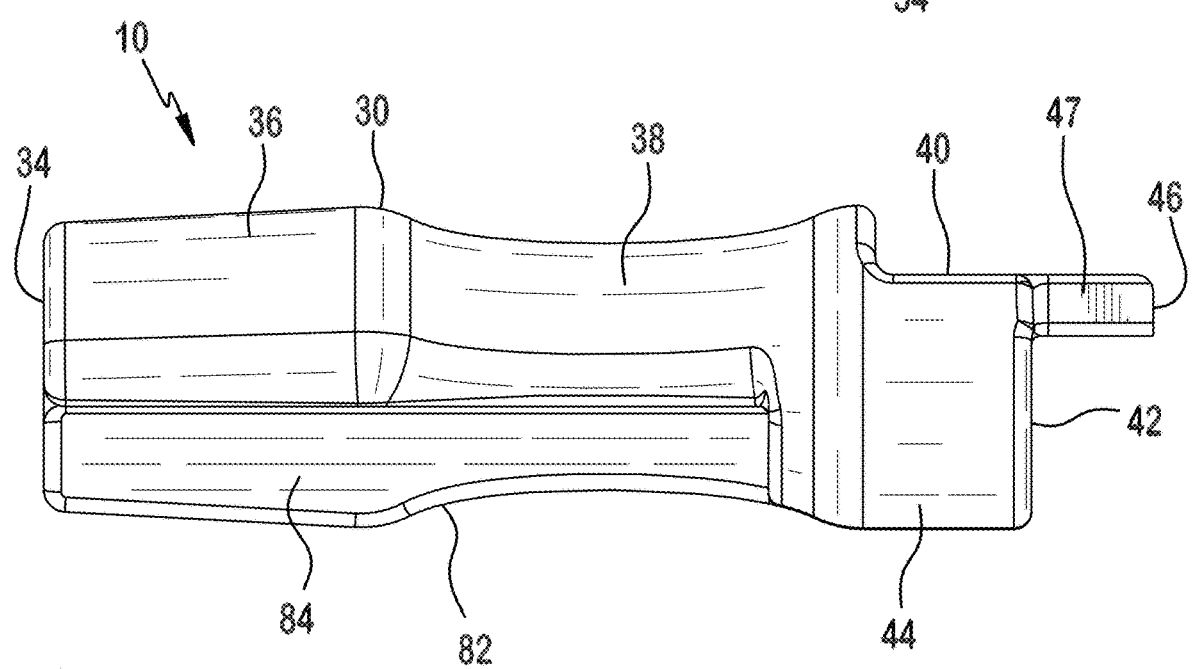

FIG. 26 is a side view of an alternative preferred embodiment of the ergonomic grip 10. In this embodiment, the ergonomic grip 10 may comprise an extended section 82. The extended section 82 may comprise an end face 84. The end face 84 may extend axially and be coplanar with the inner surface of the pinching portion 54. The end face 84 may effectively extend the bow gripping portion 42 along a side of the grip 30 opposite the side proximal the user 1 when the ergonomic grip 10 may be in use.

DETAILED DESCRIPTION OF THE PREFERRED EMBODIMENT

Certain terminology is used in the following description for convenience only and is not limiting. The words "right," "left," "up," and "down" designate the directions as they would be understood by a person facing in the viewing direction unless specified otherwise. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The words "outer" and "inner" refer to directions away from and toward, respectively, the geometric center of the specified element, or, if no part is specified, the geometric center of the ergonomic grip 10. The terms "downward" and "upward" refers to directions above (or away from) and below (or toward) the ergonomic grip 10 during operation, respectively, unless specified otherwise. The terms "forward" and "front" refer to a direction outwardly and away from the front surface 34 of the ergonomic grip 10, and the term "rear" and "back" refers to a direction outwardly and away from the back surface 46 of the ergonomic grip. The terms "axial" and "radial" refer to directions along the central longitudinal axis C and around the central longitudinal axis C, respectively. The terms "touching," "abutting," "against," and "contacting" when used in connection with two surfaces is defined as meaning "being positioned anywhere between actual touching of two surfaces to being in facing orientation and within 1 inch (or 2.54 centimeters) apart." Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. The language "at least one of 'A', 'B', and 'C'," as used in the claims and in corresponding portions of the specification, means "any group having at least one 'A'; or any group having at least one 'B'; or any group having at least one 'C';—and does require that a group have at least one of each of 'A', 'B', and 'C'." More specifically, the language 'at least two/three of the following list' (the list itemizing items '1', '2', '3', '4', etc.), as used in the claims, means at least two/three total items selected from the list and does not mean two/three of each item in the list. The term "interior", as used in the claims and corresponding portions of the specification means the area proximate to the center of the invention. While a violin bow is shown in FIG. 1, the term "violin bow" or "instrumental bow" as used in the specification and claims, is defined as meaning "any one of a violin bow, viola bow, cello bow, bass bow, stinged instrument bow, or the like." The term "exterior" similarly defines the area not in proximity to the center of the invention. Additionally, the words "a" and "one" are defined as including one or more of the referenced items unless specifically stated otherwise. The terminology includes the words specifically mentioned above, derivatives thereof, and words of similar import.

Referring generally to FIGS. 1-24, wherein like numerals indicate like elements throughout, the ergonomic grip 10 for use with a violin bow 12 are disclosed in its preferred embodiments. One of ordinary skill in the art would appreciate from this disclosure that the present invention may be attached to any violin bows, viola bows, cello bows, bass bows, or any other stringed instrument bows without departing from the scope of the present invention. The present invention may be entirely manually/hand driven and be free of (and/or not use) any motors, hydraulics, electrical devices, or similar drive producing mechanisms. One of ordinary skill in the art would appreciate from this disclosure that the terms retrofit grip and grip trainer may be substituted for the ergonomic grip 10 without departing from the scope of the present invention.

Referring specifically to FIG. 1, a user 1 may be seen using the ergonomic grip 10 to play a violin 20. The ergonomic grip 10 may be attached to a violin bow 12 which may be used to play the violin 20. The violin 20 may comprise a body 22 and a neck 26 extending therefrom. A plurality of strings 24 may extend from one of the body 22 to an opposite end of the neck 26. The violin bow 12 configured with the ergonomic grip 10 attached thereto may be employed to play the violin 20. Generally speaking, the grip trainer 10 may be advantageous to either teach the proper grip technique to beginners to use when holding a violin bow 12 or reinforce proper gripping habits with experienced players for holding a violin bow 12. The tendency of new users 1 may be to firmly grasp the violin bow 12 with their hand 2 and, more specifically, with their fingertips. However, it may actually be desirous to rest the fingers 2 on the violin bow 12 in order to slide and/or guide the violin bow 12 across the plurality of strings 24 and allow the weight of the violin bow 12 to be supported by the violin 20 itself. This technique may be described later in greater detail with reference to FIGS. 16-23.

Referring now generally to FIGS. 2 and 4, the ergonomic grip 10 may be seen separated from the violin bow 12. This arrangement may represent the proper alignment required to subsequently attach the ergonomic grip 10 to the violin bow 12 as seen in other figures. The violin bow 12 may comprise a main shaft 14 extending axially and a hair 16 running parallel to the main shaft 14. The hair 16 may also be herein referred to as a bow string 16. The hair 16 may be connected to the main shaft 14 by a frog 15 located therebetween. The U-shaped indentation in the frog 15 may define a throat 17. The throat may be configured to allow a user 1 to place a thumb 8 therein. A standard violin bow 12 may also comprise a screw at the end of the main shaft 14 proximal to the frog 15. The ergonomic grip 10 may comprise a grip body 30 and a bow groove 32. A central longitudinal axis C may extend axially through the radial center of the ergonomic grip 10. The bow groove 32 may extend axially along the central longitudinal axis C. The bow groove 32 may also be herein referred to as a channel 32. The main shaft 14 of the violin bow 12 may be configured to be inserted into the bow groove 32.

Referring now generally to FIGS. 3, 5, and 6, the ergonomic grip 10 may be seen attached to the violin bow 12. The grip body 30 of the ergonomic grip 10 may comprise a forward surface 36, an intermediary surface 38, and an upper rear surface 40. The intermediary surface 38 may be between the forward surface 36 and the upper rear surface 40. The forward and intermediary surfaces 36, 38 may collectively be referred to as a second section. The forward surface 36 may be delineated at one end by a front surface 34. The front surface 34 may form one axial end of the ergonomic grip 10. The forward surface 36 and the intermediary surface 38 may be rounded. The intermediary surface 38 may be curved and/or contoured such that the radial extension of the intermediary surface 38 at different axial points may differ. The ergonomic grip 10 may also comprise a bow gripping portion 42 extending circumferentially from the upper rear surface 40. The upper rear surface 40 may be flat. The bow gripping portion 42 may have a bow gripping portion outer surface 44 defining the radially outermost surface of the bow gripping portion 42. The bow gripping portion 42 may be referred to as a first section. The bow gripping portion 42 may be configured to squeeze and/or pinch and/or grab onto the frog 15 of the violin bow 12. As can be seen in FIG. 6, the forward and intermediary surfaces 36, 38 may only extend a partial circumferential distance such that the space between the main shaft 14 of the violin bow 12 and the hair 16 may unobstructed. This may also leave the throat 17 of the violin bow 12 exposed such that a user 1 may be able to insert a thumb 8 therein. The ergonomic grip 10 may also have a back extending portion 47 that partially defines the upper beer surface 40 thereon. The back extending portion 47 may be delineated by a back surface 46 forming an axial end opposite the front surface 34.

Referring now generally to FIGS. 7, 8, and 13, the ergonomic grip 10 may be seen when unattached to a violin bow 12. These figures may highlight how the bow gripping portion 42 makes sense circumferentially further than the forward and intermediary surfaces 36, 38. It may also be seen how the upper rear surface 40 may comprise a pinky contacting portion 48 therein. The pinky contacting portion 48 may be recessed into the upper rear surface 40. As will be described later in greater detail, the pinky contacting portion 48 may be configured to allow the pinky 9 of a user 1 to rest thereon.

Referring now generally to FIGS. 9, 10, 14, and 15, an underside 50 of the ergonomic grip 10 may be seen in greater detail. The underside 50 may delimit a circumferential end of the forward and intermediary surfaces 36, 38. The underside 50 may be flat. One of ordinary skill in the art would appreciate from this disclosure that the underside 50 may be rounded, bumpy, textured, grooved, or the like, without departing from the scope of the present invention. The underside 50 may be connected by a bow contacting surface 52 therebetween. The bow contacting surface 52 may define the bow groove 32. The bow contacting surface 52 may be rounded. One of ordinary skill in the art would appreciate from this disclosure that the bow contacting surface may be flat, rounded, square, hexagonal, trapezoidal, or the like, without departing from the scope of the present invention. The bow gripping portion 42 may also define a pinching portion 54 therein. The pinching portion 54 may be coaxial with the bow groove 32. The pinching portion 54 may be configured to form a pressure fit around the frog 15 of a violin bow. One of ordinary skill in the art would appreciate from this disclosure that the material of the ergonomic grip may be flexible to allow the main shaft 14 of the violin bow 12 to be squeezed through the pinching portion 54 while simultaneously allowing the pinching portion 54 to return to its original separation without departing from the scope of the present invention.

Referring specifically to FIG. 11, the ergonomic grip 10 may be seen from a rear perspective. The ergonomic grip 10 may have a body diameter D. The bow groove 32 may have a groove width G. It is preferable, but not necessary, that the body diameter D may be between two times to six times the diameter of the groove width G. It is further preferable, but not necessary, that the body diameter D may be at least three times that of the groove width G. It may be more preferable still that the body diameter D may be at least four times that of the groove width G. The ratio of the body diameter D to the groove width G may be necessary for structural integrity of the ergonomic grip 10 and/or to fit the various potential sizes of hands 2 of users 1. It may also be preferable that the separation distance of the pinching portion 54 be less than or equal to the groove width G.

Referring specifically to FIG. 12, the ergonomic grip 10 may be seen from a front perspective. The bow contacting surface 52 may be seen in greater detail. In this embodiment, the bow contacting surface 52 may be comprised of a plurality of flat surfaces instead of a continuous singular rounded surface. This figure may also highlight the semi continuous rounded outer face 56 of the ergonomic grip 10. The semi continuous rounded outer face 56 may be interrupted circumferentially on the forward and intermediary surfaces 36, 38 by the underside 50 of the ergonomic grip 10. Similarly, the semi continuous rounded outer face 56 may be interrupted circumferentially on the bow gripping portion 42 by the pinching portion 54.

Referring now generally to FIGS. 16-23, a hand 2 of a user 1 may be seen engaging with the ergonomic grip 10. The hand 2 may comprise at least one finger 3. The at least one finger 3 may have a distal phalanx 4 with a distal end 5. The at least one finger 3 may also have a proximal phalanx 7 connected to the hand 2 and a middle phalanx 6 connecting the proximal phalanx 7 to the distal phalanx 4. The at least one finger 3 may be an index 62, middle 64, ring, or pinky 9 finger. A thumb 8 may also be inserted into the throat 17 of the violin bow 12. Inserting the thumb 8 into the throat 17 of the violin bow 12 may be the first step of properly grasping the violin bow 12 with a hand 2. The cutaway design of the ergonomic grip 10 in the regions of the forward and intermediary surfaces 36, 38 may allow the thumb 8 to easily access and be unobstructed from the throat 17.

Referring now specifically to FIG. 17, the hand 2 of a user 1 may be seen properly holding the ergonomic grip 10 when attached to a violin bow 12. The forward and intermediary surfaces 36, 38 may define a target area 60. The target area 60 may be configured for the at least one finger 3 to be placed thereon. The index finger 62, the middle finger 64, and/or the ring finger may be placed, in any combination, but preferably all three, on the target area 60. However, only the distal phalanx 4 of the at least one finger 3 may contact the target area 60 since this may be the proper violin bow 12 holding position. It may be a tendency for the user 1 to grip the main shaft 14 of the bow with all phalanges 4, 6, 7 as well as the hand 2 itself. However, this type of grip may be improper and/or impractical for more advanced violin 20 playing. The individual contacts for the at least one finger 3 may be seen in greater detail in FIGS. 19-23.

Referring specifically to FIG. 18, the position of the index finger 62 on the ergonomic grip 10 may be seen. The index finger 62 may be in contact with the target area 60 formed on the forward surface 36. Preferably, but not necessarily, only the distal phalanx 4 of the index finger 62 may contact the target area 60. In this way, the distal phalanx 4 of the index finger 62 may be generally tangent to the target area 60. "Generally tangent to the target area" preferably means that the referred to element contacts at least one point of the target area 60 and other portions of the referred to element, or finger, extend perpendicularly and outwardly away from that at least on point of contact on the target area. More preferably, "generally tangent to the target area" means that the referred to element contacts one point of the target area 60 and other portions of the referred to element, or finger, extend perpendicularly and outwardly away from that at least on point of contact on the target area. Most preferably, "generally tangent to the target area" means that the referred to element, or finger, is tangent to the target area 60.

Still referring to FIG. 18, the distal end 5 of the index finger 62 may point generally away from the bow groove 32. "Generally away from the bow groove" preferably means that the distal end 5 of the at least one finger 3 forms at least a ninety-degree (90°) angle with a line drawn perpendicularly outwardly from the central longitudinal axis C. More preferably, "generally away from the bow groove" means that the distal end 5 of the at least one finger 3 forms at least a one hundred twenty-degree (120°) angle with a line drawn perpendicularly outwardly from the central longitudinal axis C. More preferably still, "generally away from the bow groove" means that the distal end 5 of the at least one finger 3 forms at least a one hundred fifty-degree (150°) angle with a line drawn perpendicularly outwardly from the central longitudinal axis C. Most preferably, "generally away from the bow groove" means that the distal end 5 of the at least one finger 3 forms a one hundred eighty-degree (180°) angle with a line drawn perpendicularly outwardly from the central longitudinal axis C.

Referring now to FIG. 19, the proper positioning of the index finger 62 directly on the main shaft 14 of the violin bow 12 may be seen. This holding technique may have been taught, instilled, reinforced, coached, or impressed upon the user 1 while the ergonomic grip 10 may have been attached to the violin bow 12 as shown in FIG. 18. This may be the end goal of using the grip trainer 10 in the first place. The grip trainer 10 may be designed to be freely removed after the proper way to grip a violin bow 12 may have been learned by a user 1.

Referring specifically to FIG. 20, the position of the middle finger 64 on the ergonomic grip 10 may be seen. The middle finger 64 may be in contact with the target area 60 formed on the intermediary surface 38. Preferably, but not necessarily, only the distal phalanx 4 of the middle finger 64 may contact the target area 60. In this way, the distal phalanx 4 of the middle finger 64 may be generally tangent to the target area 60. Also, the distal end 5 of the middle finger 64 may point generally away from the bow groove 32.

Referring now to FIG. 21, the proper positioning of the middle finger 64 directly on the main shaft 14 of the violin bow 12 may be seen. This holding technique may have been taught, instilled, reinforced, coached, or impressed upon the user 1 while the ergonomic grip 10 may have been attached to the violin bow 12 as shown in FIG. 20. This may be the end goal of using the grip trainer 10 in the first place. The grip trainer 10 may be designed to be freely removed after the proper way to grip a violin bow 12 may have been learned by a user 1.

Referring now generally to FIGS. 18 and 20, the ergonomic grip 10 may be seen to have a generally semicircular cross-section 70. The generally semicircular cross-section 70 may change in area depending on if it may be taken at a plane bisecting the forward surface 36 or the intermediary surface 38. A "generally semicircular cross-section" preferably means that the area of the cross-section be between twenty-five percent (25%) and seventy-five percent (75%) of a full circle. More preferably, a "generally semicircular cross-section" means that the area of the cross-section be between thirty-five percent (35%) and sixty-five percent (65%) of a full circle. More preferably still, a "generally semicircular cross-section" means that the area of the cross-section be between forty-five percent (45%) and fifty-five percent (55%) of a full circle. Most preferably, a "generally semicircular cross-section" means that the area of the cross-section be half, or fifty percent (50%), of a full circle.

Referring now to FIG. 22, the pinky 9 may be seen contacting the pinky contacting portion 48 formed in the upper rear surface 40. This may be the only finger on the hand 2 of the user 1 that the distal end 5 contacts the ergonomic grip 10 directly. The recessed pinky contacting portion 48 may be positioned such that the pinky 9 naturally and comfortably may fall into the pinky contacting portion 48. In this way, the pinky 9 may not point generally away from the bow groove 32.

Referring now to FIG. 23, the proper positioning of the pinky 9 directly on the main shaft 14 of the violin bow 12 may be seen. This holding technique may have been taught, instilled, reinforced, coached, or impressed upon the user 1 while the ergonomic grip 10 may have been attached to the violin bow 12 as shown in FIG. 22. This may be the end goal of using the grip trainer 10 in the first place. The grip trainer 10 may be designed to be freely removed after the proper way to grip a violin bow 12 may have been learned by a user 1.

Referring to FIG. 24, the entire profile of the ergonomic grip 10 may be seen overlaying the violin bow 12 when the ergonomic grip 10 may be attached thereto. This figure may show how the bow gripping portion 42 overlays both a portion of the main shaft 14 as well as a portion of the frog 15. The ergonomic grip 10 may also extend a length of the violin bow 12 from the screw 18 to the a midpoint along the main shaft 14 and over a portion of the hair 16. The ergonomic grip 10 may be configured to fully extend the axial length of the frog 15 and the throat 17 of the violin bow 12.

Referring now generally to FIGS. 25 and 26, an alternative preferred embodiment of the ergonomic grip 10 may be seen. This alternative preferred embodiment of the ergonomic grip 10 may comprise an extended section 82. This extended section 82 may increase the surface area of the forward and intermediary surfaces 36, 28. The forward and intermediary surfaces 36, 38 may extend approximately two hundred seventy degrees (270°) around the grip body 30 in this alternative preferred embodiment of the ergonomic grip 10 comprising the extended section 82. "Extend approximately two hundred seventy degrees (270°)" preferably means that the forward and intermediary surfaces 36, 38 extend at least one hundred eighty degrees (180°) around the circumference of the grip body 30. More preferably, "extend approximately two hundred seventy degrees (270°)" means that the forward and intermediary surfaces 36, 38 extend at least two hundred ten degrees (210°) around the circumference of the grip body 30. More preferably still, "extend approximately two hundred seventy degrees (270°)" means that the forward and intermediary surfaces 36, 38 extend at least two hundred forty degrees (240°) around the circumference of the grip body 30. Most preferably, "extend approximately two hundred seventy degrees (270°)" means that the forward and intermediary surfaces 36, 38 extend two hundred ten degrees (210°) around the circumference of the grip body 30. The extended section 82 may be entirely circumferentially aligned with the bow gripping portion 42.

Referring still to FIGS. 25 and 26, the extended section 82 may comprise an end face 84. The end face 84 may be coplanar with the inner surface of the pinching portion 54 of the bow gripping section 42. The end face 84 may also be perpendicular to the underside 50 of the ergonomic grip 10. Similar to the underside 50 on the side of the grip body 30 closest to the user 1 when the ergonomic grip 10 may be engaged with a violin bow 12, the end face 84 may delineate one edge of the bow contacting surface 52 and/or the bow groove 32. One of ordinary skill in the art would appreciate from this disclosure that this alternative preferred embodiment of the ergonomic grip 10 disclosed in FIGS. 25 and 26 may function similarly and/or identically to the preferred embodiment disclosed in FIGS. 1-24 without departing from the scope of the present invention. One of ordinary skill in the art would also appreciate from this disclosure that the only difference between this alternative preferred embodiment of the ergonomic grip 10 disclosed in FIGS. 25 and 26 and the preferred embodiment disclosed in FIGS. 1-24 may be the inclusion of an extended section 82.

Preferably, but not necessarily, the ergonomic grip may be less than or equal to one foot (1') in axial, end-to-end length. More preferably, the ergonomic grip may be less than nine inches (9") in axial, end-to-end length. Most preferably, the ergonomic grip may be less than nine inches (9") in axial, end-to-end length.

Preferably, but not necessarily, the body diameter D of the ergonomic grip 10 may be less than or equal to four inches (4"). More preferably, the body diameter D of the ergonomic grip 10 may be less than or equal to three inches (3"). Most preferably, the body diameter D of the ergonomic grip 10 may be less than or equal to two inches (2").

One advantage of the ergonomic grip trainer 10 may be to provide a detachably affixable accessory for a stringed instrument bow 12 that may teach a proper and efficient grip technique required for playing the stringed instrument 20. Another advantage of the ergonomic grip 10 may be that it may be designed to be removed once proper gripping habits and techniques have been formed by the musician. The ergonomic grip 10 may be further advantageous in that it may be accessible and cheap to produce.

One of ordinary skill in the art will appreciate from this disclosure that the ergonomic grip 10 may be entirely manually powered or spring powered, and free of all motors and electrical components, may be operated by a powered device, may include a motor, or may be operated manually with a powered assist without departing from the scope of the present invention.

One of ordinary skill in the art will appreciate from this disclosure that the ergonomic grip 10 can be used with any suitable instrument and/or instrument accessory without departing from the scope of the present invention.

One of ordinary skill in the art will appreciate from this disclosure that the various components and elements of the present invention may be constructed of any suitably strong, wear-resistant, flexible (where desired), and inexpensive metals, polymers, alloys, plastics, fabrics, and other materials without departing from the scope of the present invention.

One of ordinary skill in the art will appreciate from this disclosure that device elements, as well as materials, shapes and dimensions of device elements, as well as methods other than those specifically exemplified can be employed in the practice of the invention without resorting to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed, described in the specification, and/or shown in the figures. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention.

What is claimed is:

1. An ergonomic grip for an instrumental bow, the instrumental bow having a main shaft with an outer shaft surface, the ergonomic grip being configured for use by a hand of a user, the hand having: at least one of the group of: a ring finger having a ring finger tip and a ring finger distal end; a middle finger having a middle finger tip and a middle finger distal end; and an index finger having an index finger tip and an index finger distal end, the ergonomic grip comprising:
   a grip body having a central longitudinal axis, the grip body having an intermediary surface defining a target area, the target area having a generally semicircular cross-section taken in a direction perpendicular to the central longitudinal axis; and
   a bow groove extending into the grip body along the central longitudinal axis;
   wherein the bow groove is configured to receive the main shaft of the instrumental bow and secure the ergonomic grip thereto; and
   the target area of the grip body being configured for the ring finger, the middle finger, and the index finger of the user to be placed thereover, wherein the target surface being curved and spaced from the outer shaft surface, the target area of the grip body being configured such that when any of the ring finger, the middle finger, and the index finger is positioned over the target area the associated any of the ring finger tip, the middle finger tip, and the index finger tip is supported and oriented in a direction generally tangent to the target area with the associated any of the ring finger distal end, the middle finger distal end, and the index finger distal end pointing generally away from the bow groove such that the grip body prevents the ring finger, the middle finger, and the index finger from touching the main shaft of the instrumental bow when the grip body is attached thereto and the grip body is held by a user.

2. The ergonomic grip of claim 1, wherein the grip body has a body diameter and the bow groove has a groove width, the body diameter being at least three times greater than the groove width.

3. The ergonomic grip of claim 1, wherein the target area is textured to improve grip.

4. The ergonomic grip of claim 1, wherein the target area is contoured to improve comfortability of a user's grip.

5. The ergonomic grip of claim 1, wherein the main shaft of the instrumental bow is secured into the bow groove of the ergonomic grip via a pressure fit.

6. The ergonomic grip of claim 1, wherein the grip body has a semi-continuous, rounded outer face, the semi-continuous, rounded outer face only being interrupted by the bow groove.

7. The ergonomic grip of claim 5, wherein the grip body further comprises a bow gripping portion, the bow gripping portion having a pinching portion and at least partially defining the bow groove, the pinching portion forming the pressure fit around a frog of the instrumental bow.

8. The ergonomic grip of claim 1, wherein the bow groove has a first section and a second section, the first and second sections being in series, the second section being wider than the first section.

9. The ergonomic grip of claim 1, wherein the bow groove has a first section and a second section, the first and second sections being in series, the second section being wider than the first section such that the second section allows the user to properly position a thumb in contact with the main shaft and in a throat of the instrumental bow.

10. The ergonomic grip of claim 1, wherein the ergonomic grip is formed from a single piece and made of a lightweight, high-friction material.

11. A retrofit grip for a violin bow having a bow shaft with an outer shaft surface and a bow string, the retrofit grip being configured for use by a hand of a user, the hand having: at least of the group of: a ring finger having a ring finger tip and a ring finger distal end; a middle finger having a middle finger tip and a middle finger distal end; and an index finger having an index finger tip and an index finger distal end, the retrofit grip comprising:
   a grip body having a central longitudinal axis and an outer surface defining a target area the target area having a generally semicircular cross-section taken in a direction perpendicular to the central longitudinal axis; and
   a channel extending along the longitudinal axis, the channel having a central bow shaft receiving portion extending through a radial center of the grip body and a transverse portion extending between the outer surface of the grip body and the central bow shaft receiving portion;
   wherein the transverse portion is narrower than the central bow shaft receiving portion such that the bow shaft cannot slip out of the central bow shaft receiving portion via the transverse portion; and
   wherein the target area of the grip body is configured for the ring finger, the middle finger, and the index finger of the user to be placed thereover, the target surface being curved and spaced from the outer shaft surface, the target area of the grip body being configured such that when any of the ring finger, the middle finger, and the index finger is positioned over the target area the associated any of the ring finger tip, the middle finger tip, and the index finger tip is supported and oriented in a direction generally tangent to the target area with the associated any of the ring finger distal end, the middle finger distal end, and the index finger distal end pointing generally away from the channel such that the grip body prevents the ring finger, the middle finger, and the index finger from touching the main shaft of the instrumental bow when the grip body is attached thereto and the grip body is held by a user.

12. The ergonomic grip of claim 1, wherein the retrofit body has a body diameter and the channel has a groove width, the body diameter being at least three times greater than the groove width.

13. The retrofit grip of claim 11, wherein the outer surface is textured to improve grip.

14. The retrofit grip of claim 12, wherein the body diameter is at least four times greater than the groove width.

15. The retrofit grip of claim 11, wherein the channel has a first section and a second section, the first and second sections being in series, the second section being wider than the first section such that the second section allows a user to properly position a thumb between the bow string and the bow shaft of the violin bow.

16. The ergonomic grip of claim 11, wherein the grip body has a semi-continuous, rounded outer face, the semi-continuous, rounded outer face only being interrupted by the bow holding portion.

\* \* \* \* \*